United States Patent
Jang et al.

(10) Patent No.: US 9,705,411 B2
(45) Date of Patent: Jul. 11, 2017

(54) SOFT-SWITCHED BIDIRECTIONAL BUCK-BOOST CONVERTERS

(71) Applicant: Delta Electronics, Inc., Neihu (TW)

(72) Inventors: Yungtaek Jang, Chapel Hill, NC (US); Milan M. Jovanović, Cary, NC (US)

(73) Assignee: Delta Electronics, Inc., Neihu (TW)

( * ) Notice: Subject to any disclaimer, the term of this patent is extended or adjusted under 35 U.S.C. 154(b) by 0 days.

(21) Appl. No.: 14/962,997

(22) Filed: Dec. 8, 2015

(65) Prior Publication Data
US 2017/0163163 A1    Jun. 8, 2017

(51) Int. Cl.
*H02M 3/335* (2006.01)

(52) U.S. Cl.
CPC ................ *H02M 3/33546* (2013.01)

(58) Field of Classification Search
CPC ................ H02M 3/33546
See application file for complete search history.

(56) References Cited

U.S. PATENT DOCUMENTS

| | | | | |
|---|---|---|---|---|
| 5,477,131 A * | 12/1995 | Gegner | ................ | H02M 3/158 323/222 |
| 5,736,842 A | 4/1998 | Jovanovic | | |
| 6,987,675 B2 | 1/2006 | Jovanovic | | |
| 8,581,147 B2 * | 11/2013 | Kooken | ................ | B23K 9/095 219/130.1 |
| 2005/0041439 A1 * | 2/2005 | Jang | ................ | H02M 7/5387 363/17 |
| 2005/0243579 A1 * | 11/2005 | Jang | ................ | H02M 3/335 363/16 |
| 2007/0051712 A1 * | 3/2007 | Kooken | ................ | B23K 9/095 219/130.1 |
| 2010/0097031 A1 * | 4/2010 | King | ................ | B60L 11/1803 320/109 |
| 2012/0099348 A1 * | 4/2012 | Umetani | ................ | H02M 3/158 363/37 |
| 2014/0132231 A1 * | 5/2014 | Tsai | ................ | H02M 3/155 323/223 |

OTHER PUBLICATIONS

H. Do, Sep. 2011, IEEE, Trans. Power Electronics, vol. 26 No. 9, 2563-2569.*

* cited by examiner

*Primary Examiner* — Jue Zhang
(74) *Attorney, Agent, or Firm* — VLP Law Group LLP; Edward Kwok

(57) ABSTRACT

A bidirectional buck-boost converter includes at least one soft-switching cell to reduce switching losses by providing soft-switching of all semiconductor devices. A soft-switching cell comprises an active switch coupled in series with an inductor, a two-winding transformer, and a reset-voltage circuit. The soft-switching cells enable the buck and boost rectifiers to turn off with a controlled turn-off rate of their current to minimize their reverse-recovery losses, the power-controlling buck and boost switch to turn on with zero-voltage switching (ZVS), and the switch of the soft-switching cell to turn off with zero-current switching (ZCS).

25 Claims, 19 Drawing Sheets

SOFT-SWITCHED BIDIRECTIONAL BUCK-BOOST CONVERTERS

BACKGROUND OF THE INVENTION

1. Field of the Invention

This invention relates to the buck-boost converters, and more particularly, to buck-boost converters with soft switching in all of their semiconductor components.

2. Description of the Related Art

Bidirectional converters are increasingly being used in power systems with energy-storage capabilities (e.g., "smart-grid" and automotive applications), where they condition charging and discharging of energy-storage devices (e.g., batteries and super-capacitors). For example, in automotive applications, isolated bidirectional converters are used in electric vehicles (EVs) to provide bidirectional energy exchange between the high-voltage (HV) battery and the low-voltage (LV) battery, while non-isolated bidirectional converters are typically employed to optimize the traction inverter performance by pre-regulating its input voltage, as well as provide energy regeneration. Because a battery's operating voltage range depends on the battery's state of charge, achieving high efficiency across the entire operating voltage range of a battery is a major design challenge in bidirectional converter designs.

Non-isolated bidirectional converters are almost exclusively implemented by the buck-boost converter topology, such as that shown in FIG. 1. As shown in FIG. 1, voltage sources $V_1$ and $V_2$ each represent any component or a combination of components that can deliver or consume electric energy (e.g., capacitors, batteries, motors, motor generators, fuel cells, and passive loads). When the circuit in FIG. 1 operates as a boost converter, power is transferred from voltage source $V_1$ to voltage source $V_2$, where the voltage of voltage source $V_2$ is greater than the voltage of voltage source $V_1$. In a boost mode, control is achieved by (i) modulating switch $S_1$ and (ii) operating switch $S_2$ as rectifier $D_2$. In a buck mode, power is transferred in the reverse direction, i.e., from voltage source $V_2$ to voltage source $V_1$. In a buck mode, control is achieved by (i) modulating switch $S_2$ and (ii) operating switch $S_1$ as rectifier $D_1$. In this disclosure, to simplify the detailed description below, the label of a circuit element also represents its value. For example, the labels "$V_1$" and "$V_2$" of voltage sources $V_1$ and $V_2$ also represent their respective voltage values. Similarly, the label "L" of inductor L also represents its inductive value.

In a power converter, at higher power levels, the continuous-conduction-mode (CCM) operation is preferred over discontinuous-conduction-mode (DCM) operation because of CCM provides better performance. As described in U.S. Pat. No. 5,736,842, entitled "*Techniques for Reducing Rectifier Reverse-Recovery-Related Losses in High-Voltage High Power Converters*," by M. M. Jovanovic ("the '842 patent"), the major limitations of CCM operations in high-voltage, high-power buck and boost converters at high frequencies are related to switching losses caused by reverse-recovery in the rectifiers and capacitive turn-on switching losses in the switches due to "hard" switching. Generally, in a unidirectional buck and boost converter, reverse-recovery-related losses can be virtually eliminated by using SiC or GaN rectifiers, instead of using the more cost-effective fast-recovery Si rectifiers. In the bidirectional buck-boost converter of FIG. 1, however, each of switches $S_1$ and $S_2$ may be implemented by a combination of a controllable switch and an antiparallel rectifier. For example, such a combination may include a SiC or GaN rectifier, and an IGBT. Alternatively, such a combination may include an emerging SiC and GaN rectifier and a MOSFET switch. The IGBT implementation is limited to a relatively low frequency, due to the relatively limited switching speed of an IGBT, which increases the size of the converter. However, at this time, the SiC or GaN switch implementation is not attractive, primarily due to increased cost, as well as a lack of sufficient in-the-field reliability data. Today's most cost-effective, high-frequency implementations can employ high-voltage Si MOSFETs only when the reverse-recovery-related losses of the slow parasitic antiparallel body diodes are significantly reduced.

A technique that has been shown to virtually eliminate reverse-recovery losses in unidirectional non-isolated converters is described in U.S. Pat. No. 6,987,675, entitled "*Soft-Switched Power Converters*," by M. M. Jovanovic et all. ("the '675 patent"). The technique described in the '675 patent employs an active snubber that controls the current turn-off rate of a rectifier. The active snubber achieves a reduction in the reverse-recovery losses, as well as creates conditions for zero-voltage switching in a power-regulating switch. In addition, this technique also achieves soft-switching of the snubber switch by turning it off at zero current.

SUMMARY

The present invention provides active-snubber methods that offer reduced switching losses in the semiconductor switches of a bidirectional buck-boost converter. Specifically, these methods reduce switching losses by soft-switching all semiconductor switches. In a buck-boost converter of the present invention, each rectifier is turned off with a controlled turn-off rate in its current to minimize reverse-recovery loss, the power-controlling switch is turned on with zero-voltage switching (ZVS), and the auxiliary switch in the active snubber is turned off with zero-current switching (ZCS). Because of the fully soft-switched operation, converters of the present invention exhibit improved efficiency and EMI performance, as compared to their conventional "hard"-switched counterparts. The present invention also enables using semiconductor switches with relative slow antiparallel diodes (rectifiers) at high frequencies.

According to one embodiment of the present invention, two active-snubber soft-switching cells reduce switching losses in a bidirectional buck-boost converter. One soft-switching cell is active during a buck-mode operation, while the other soft-switching cell is active during a boost-mode operation. Each soft-switching cell includes an active switch ("snubber switch") coupled in series with a snubber inductor, a two-winding transformer, and a reset-voltage circuit. In every switching cycle, the snubber switch is turned on prior to turning on the corresponding switch of the buck-boost converter. When the snubber switch is on, the snubber inductor controls the turn-off rate of the corresponding rectifier to reduce its reverse-recovery loss and to create a condition for zero-voltage switching in the corresponding switch. The transformer provides a reset voltage for the snubber inductor current and creates a condition for a zero-current turn-off in the snubber switch, while the reset-voltage circuit resets the magnetizing energy of the transformer.

According to one embodiment of this invention, the snubber inductor is common to both soft-switching cells (i.e., only one snubber inductor is used). In another embodiment of the present invention, both soft-switching cells share a common snubber inductor, a transformer, and a reset-voltage circuit. The component count of a soft-switching cell can be further reduced by implementing the snubber inductor from the leakage current of the transformer.

Circuits of the present invention can be implemented in a variety of ways. Specifically, many different reset-voltage circuits for resetting the transformer are possible. Finally, in AC-input applications, the circuits of the present invention and their variations can be implemented in both single- and three-phase applications.

BRIEF DESCRIPTION OF THE DRAWINGS

Like elements in the figures are assigned like reference numerals.

DETAILED DESCRIPTION OF THE PREFERRED EMBODIMENTS

Figure 1:
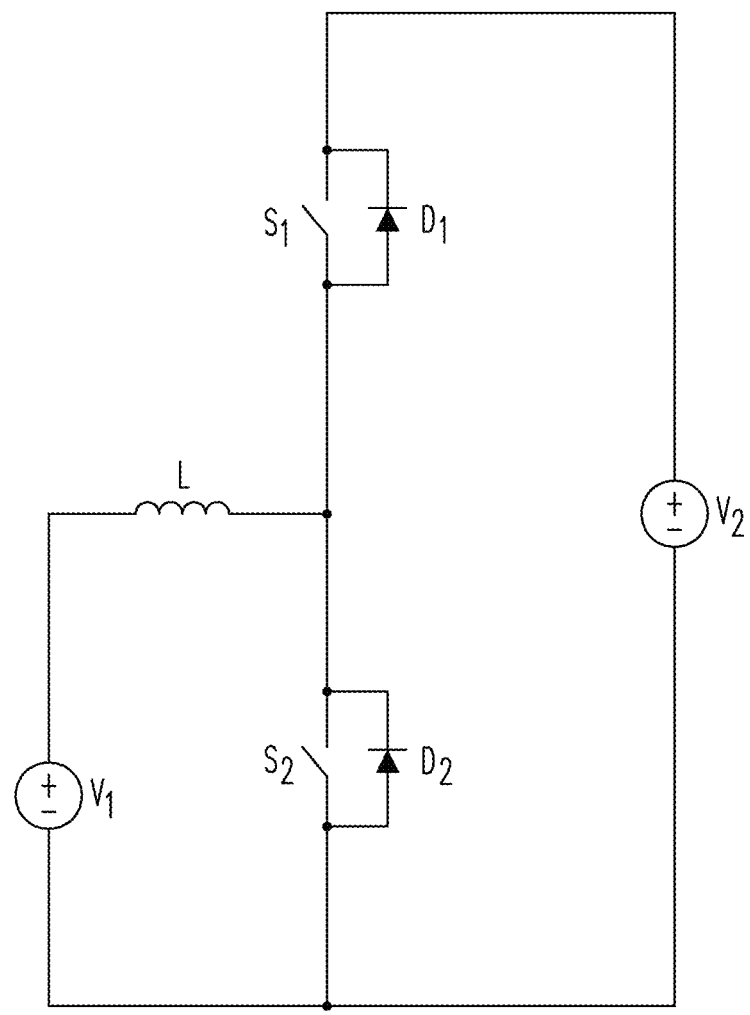
FIG. 1 shows a bidirectional buck-boost converter in the prior art.
Figure 2:
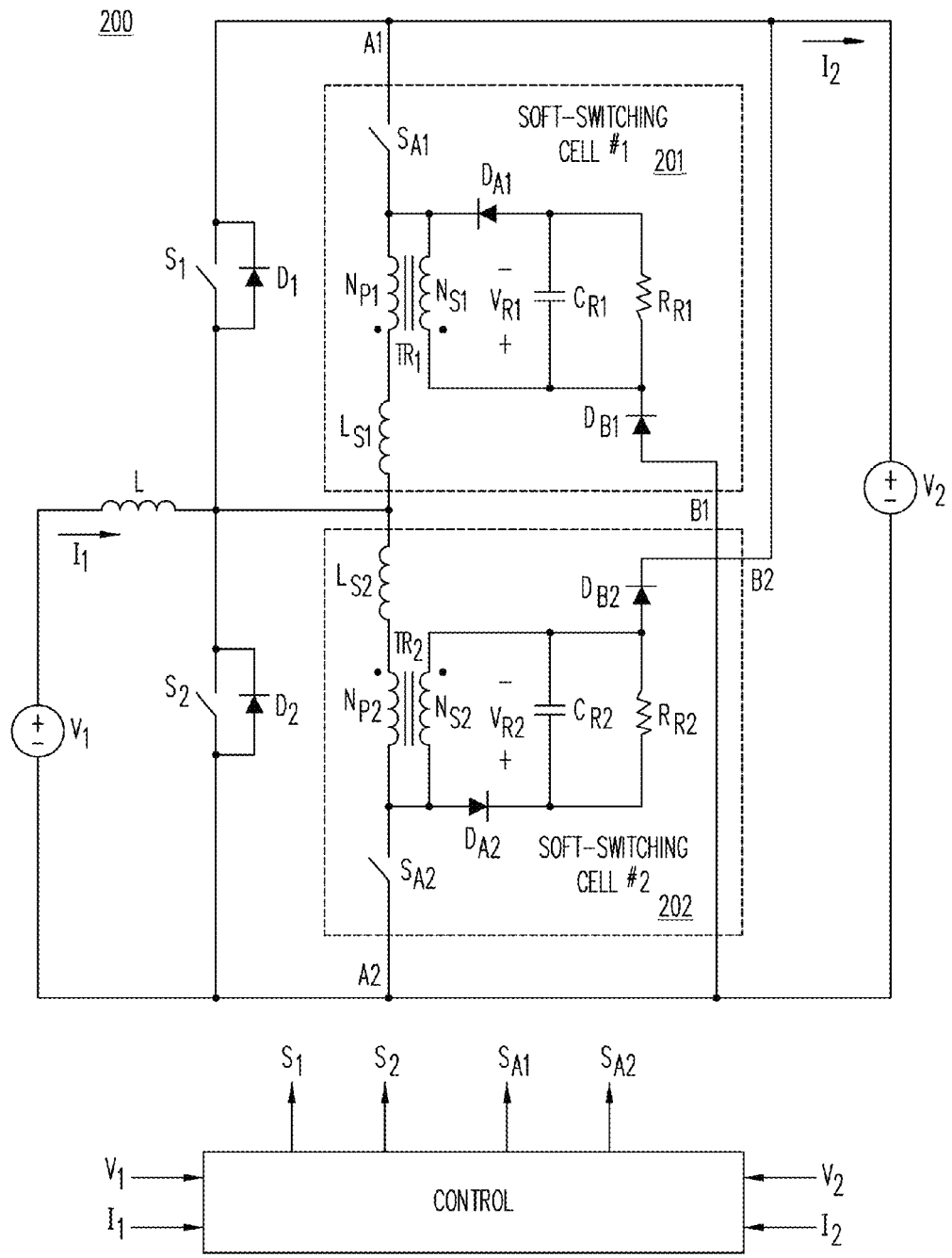
FIG. 2 shows soft-switched, bidirectional buck-boost converter 200, in accordance with an exemplary embodiment of the present invention.

FIG. 2 shows soft-switched, bidirectional buck-boost converter 200, in accordance with an exemplary embodiment of the present invention. As shown in FIG. 2, buck-boost converter 200 includes soft-switching cells 201 and 202, each including: (a) active switch $S_A$, (b) inductor $L_S$, (c) isolation transformer TR, and (d) a reset-voltage circuit formed by diode $D_A$, capacitor $C_R$, resistor $R_R$ and diode $D_B$. To distinguish the elements in soft-switching cells 201 and 202, the circuit elements of soft-switching cell 201 and the circuit elements of soft-switching cell 202 are further subscripted by the reference numeral '1' and '2,' respectively. In FIG. 2, switches $S_{A1}$ and $S_{A2}$ are unidirectional current switches that can carry current only in one direction. When a bidirectional current switch (e.g., a MOSFET) is used, a rectifier in series with the switch is provided to prevent conduction of the switch's antiparallel diode. Voltage sources $V_1$ and $V_2$ may be implemented by any kind of DC power sources or their combinations that can deliver and store received electric energy. Buck-boost converter 200 of FIG. 2 may further include electromagnetic interference (EMI) filters at the interfaces of buck-boost converter 200 with voltage sources $V_1$ and $V_2$, so as to comply with regulatory EMI requirements. These filters are omitted from FIG. 2 and subsequent figures, as their operations do not substantially affect the methods of the present invention described herein.

In bidirectional buck-boost converter 200 of FIG. 2, switch $S_2$ and diode $D_1$ are the boost switch and the boost rectifier, respectively, while switch $S_1$ and diode $D_2$ are the buck switch and the buck rectifier, respectively. In a boost mode operation, boost switch $S_2$ is controlled to provide regulation of a boost output (e.g., voltage $V_2$, current $I_2$, or power $V_2I_2$). Similarly, in a buck mode operation, buck switch $S_1$ is controlled to provide regulation of a buck output (i.e., voltage $V_1$, current $I_1$, or power $V_1 I_1$). In either mode of operation, the switch that is in parallel with the corresponding rectifier for that mode (i.e., switch $S_1$ in a boost mode, and switch $S_2$ in a buck mode) may be kept continuously open or, preferably, may be kept controlled as a synchronous rectifier to improve efficiency.

Figure 3A:
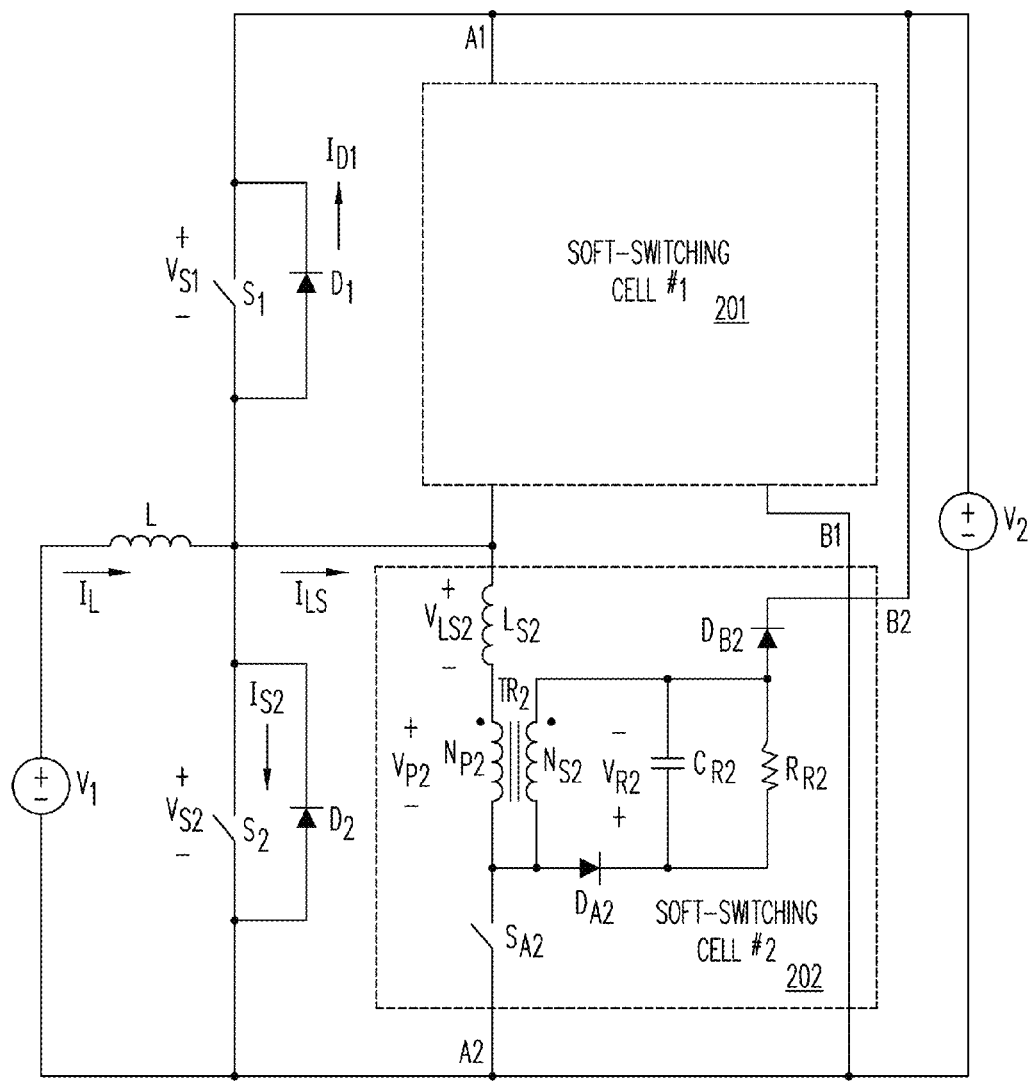
FIG. 3(a) illustrates the operation of buck-boost converter 200 of FIG. 2 during a boost mode operation, i.e., when power is transferred from voltage source $V_1$ to voltage source $V_2$, with the voltage of voltage source $V_2$ being greater than the voltage of voltage source $V_2$.

When buck-boost converter 200 of FIG. 2 operates in a boost mode (i.e., when power is transferred from voltage source $V_1$ to voltage source $V_2$), switch $S_{A1}$ is turned off so that only soft-switching cell 202 is active. FIG. 3(a) illustrates that the circuit elements in soft-switching cell 201 are inactive by omitting them from FIG. 3(a). To facilitate the following explanation of the boost mode operation, FIG. 3(b) shows key waveforms of buck-boost converter 200 during switching cycle $T_S$ of the boost mode operation, in which, for simplicity, buck switch $S_1$ is kept continuously off.

Figure 3B:
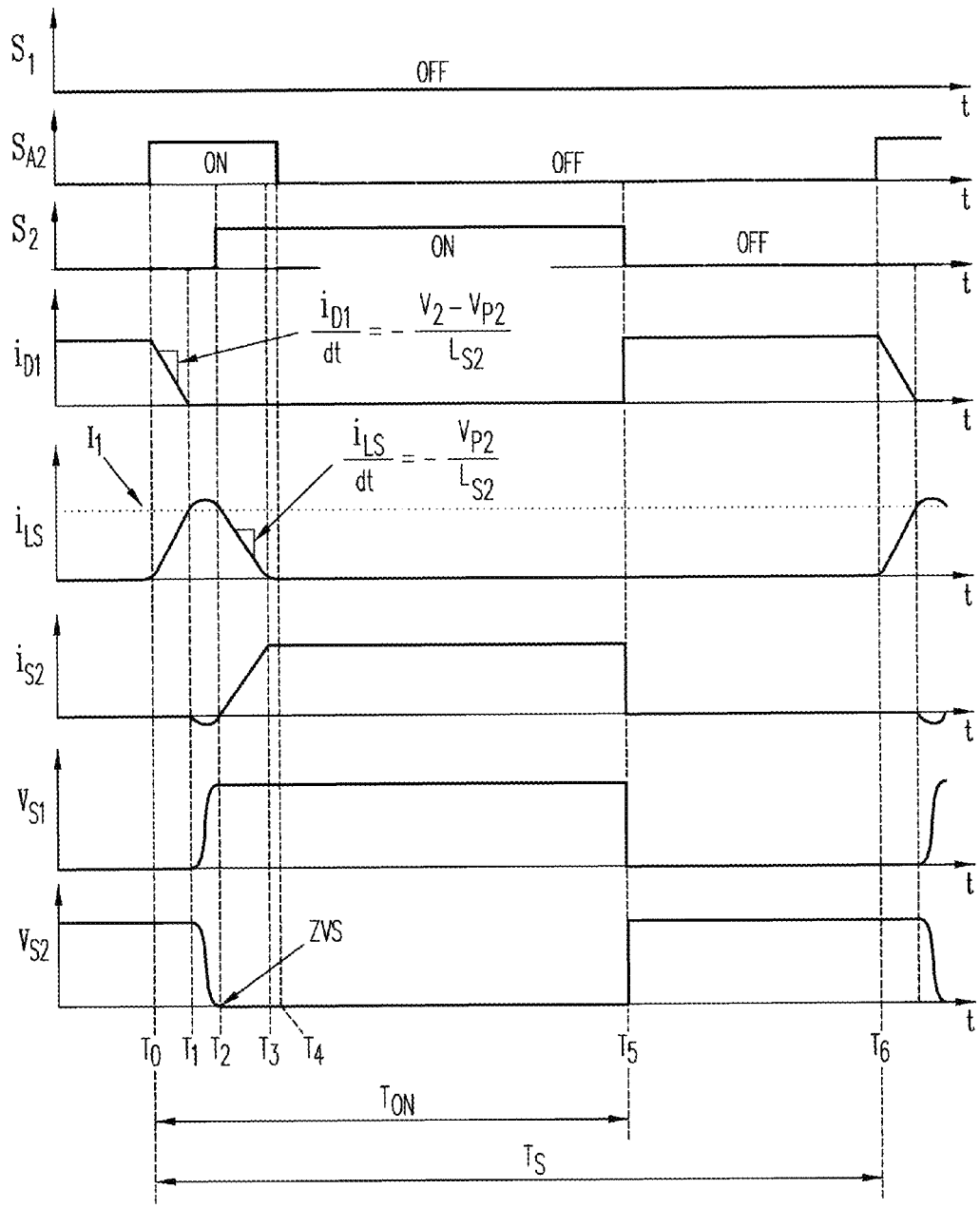
FIG. 3(b) shows key waveforms of soft-switched buck-boost converter 200 of FIG. 2, when it operates in a boost mode.

As shown in FIGS. 3(a) and 3(b), before switch $S_{A2}$ is turned on (i.e., closed) at time $t=T_0$, switches $S_1$, $S_2$ and $S_{A2}$ are off (i.e., open), so that inductor current flows through antiparallel diode $D_1$, as current $i_{LS}$ drawn by soft-switching cell 202 is zero. To reduce the reverse-recovery current of rectifier $D_1$, switch $S_{A2}$ is turned on at time $t=T_0$, shortly prior to turning on boost switch $S_2$. After switch $S_{A2}$ is turned on at time $t=T_0$, current $i_{LS}$ starts to flow as voltage $V_2$ is impressed across serially-connected inductor $L_{S2}$ and primary winding $N_{P2}$ of transformer $TR_2$. As current $i_{LS}$ flows through primary winding $N_{P2}$, a current is induced in secondary winding $N_{S2}$. The induced current in secondary winding $N_{S2}$ flows through diode $D_{B2}$ to voltage source $V_2$. So long as the induced current flows through secondary winding $N_{S2}$, the voltage across secondary winding $N_{S2}$ is clamped to the voltage $V_2$, inducing constant primary voltage $V_{P2}=(N_{P2}/N_{S2})\cdot V_2=n_2\cdot V_2$, where $n_2=N_{P2}/N_{S2}$ is the turns ratio of transformer $TR_2$. As a result, after switch $S_{A2}$ is turned on at time $t=T_0$, constant voltage $V_{LS2}=V_2-V_{P2}=V_2-n_2\cdot V_2$ is applied across inductor $L_{S2}$, causing its current $i_{LS2}=i_{LS}$ to increase linearly. As current $i_L$ of buck-boost inductor L is sufficiently large as to be considered approximately constant during a switching cycle, current $i_{D1}$ in rectifier $D_1$ decreases at the same rate at current $i_{LS2}$ increases, i.e., $di_{D1}/dt=-(V_2-V_{P2})/L_{S2}$. By controlling the current turn-off rate of rectifier $D_1$, the reverse-recovery losses can be minimized. This current turn-off rate in the boost mode operation of buck-boost converter 200 can be adjusted by a proper selection of turns ratio $n_2$ of transformer $TR_2$ and value of inductor $L_{S2}$.

After rectifier current $i_{D1}$ reaches zero at time $t=T_1$, i.e., after rectifier $D_1$ turns off, inductor current $i_{LS}$ starts discharging the parasitic output capacitance of switch $S_2$ and charging the parasitic output capacitance of switch $S_1$—the output capacitances of switches $S_1$ and $S_2$ not expressly shown in FIG. 2—by resonance between the output capacitances of switches $S_1$ and $S_2$ and inductor $L_{S2}$. As illustrated in FIG. 3(b), during this resonance, between time $t=T_1$ and time $t=T_2$, voltage $v_{S2}$ across switch $S_2$ decreases while voltage $v_{S1}$ across switch $S_1$ increases, as the sum of the switch voltages is constant (i.e., $v_{S1}+v_{S2}=V_2$). To achieve ZVS, switch $S_2$ is turned on at or shortly after its output capacitance is fully discharged. As shown in FIG. 3(b), switch $S_2$ is turned on when switch voltage $v_{S2}$ reaches zero at time $t=T_2$.

When switch $S_2$ is turned on, negative primary-winding voltage $-V_{P2}$ is impressed across inductor $L_{S2}$, i.e., $v_{LS2}=-V_{P2}$, causing inductor current $i_{LS}$ to decrease linearly with a slope $di_{LS}/dt=-V_{P2}/L_{S2}$. After inductor current $i_{LS}$ is reset to zero at time $t=T_3$, switch $S_{A2}$ can be turned-off with ZCS, as shown in FIG. 3(b). When switch $S_{A2}$ is turned off at time $t=T_4$, magnetizing current $i_m$ of transformer $TR_2$ that flows through closed switch $S_{A2}$—not expressly shown in the figures—is diverted through diode $D_{A2}$ to the reset-voltage circuit of capacitor $C_{R2}$ and parallel resistor $R_{R2}$. For proper operation, reset voltage $V_{R2}$ across resistor $R_{R2}$ is set by selecting a suitable value for $R_{R2}$, so that magnetizing current $i_m$ reaches zero before a new cycle begins at time $t=T_5$, when switch $S_2$ is turned off. Since voltage stress on switch $S_{A2}$ is given by the sum of voltage $V_2$ and reset voltage $V_{R2}$ (i.e., $V_2+V_{R2}$), minimizing the value of reset voltage $V_{R2}$ minimizes the stress on switch $S_{A2}$.

Figure 4A:
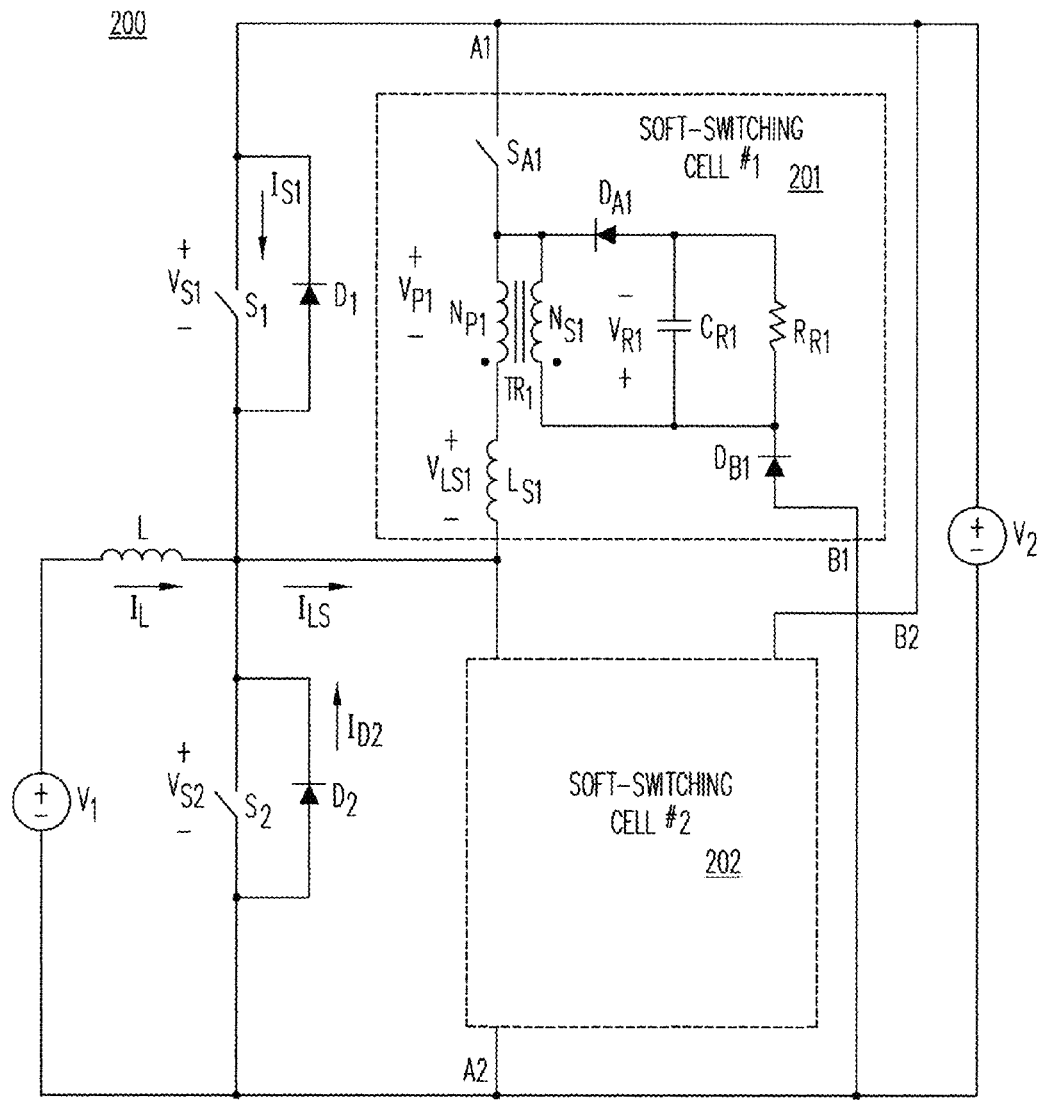
FIG. 4(a) illustrates the operation of buck-boost converter 200 of FIG. 2 during a buck mode operation, i.e., when power is transferred from voltage source $V_2$ to voltage source $V_1$, with the voltage of voltage source $V_2$ being greater than the voltage of voltage source $V_2$.
Figure 4B:
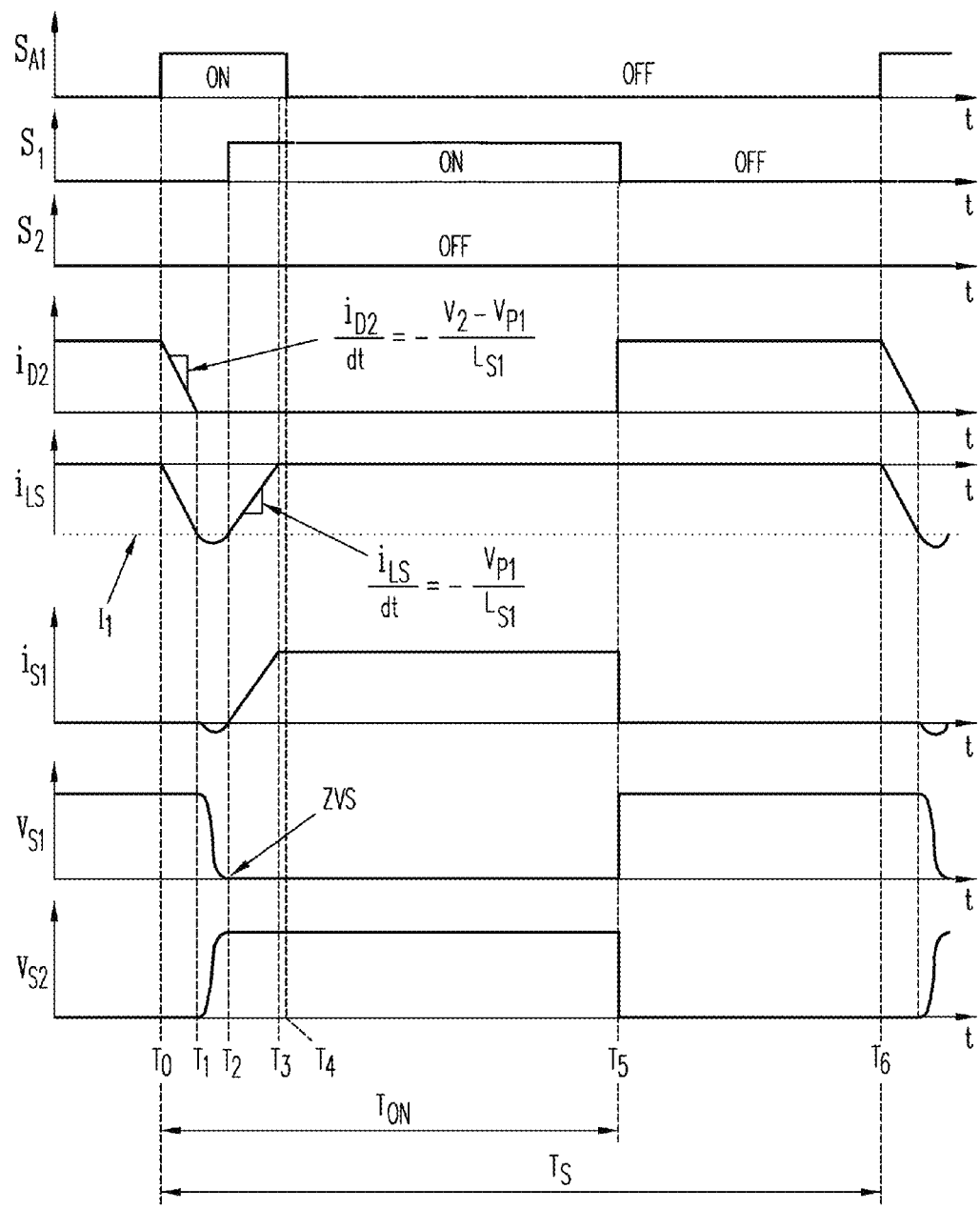
FIG. 4(b) shows key waveforms of soft-switched buck-boost converter in FIG. 2 when it operates in buck mode.

FIGS. 4(a) and 4(b) show the active parts of the buck-boost circuit in FIG. 2 and its key waveforms, when buck-boost converter 200 operates in a buck mode, i.e., when power is transferred from $V_2$ to $V_1$. In a buck mode, switch $S_{A2}$ is turned off, so that only soft-switching cell 201 is active. Again, to simplify the detailed description, the circuit components of soft-switching cell 202, which are inactive, are omitted from FIG. 4(a). As shown in FIG. 4(b), the operation of buck-boost converter 200 under a buck mode closely mirrors the operation described above in conjunction with FIG. 3(b) for boost mode.

When buck-boost converter 200 of FIG. 2 operates in a buck mode (i.e., when power is transferred from voltage source $V_2$ to voltage source $V_1$), switch $S_{A2}$ is turned off so that only soft-switching cell 201 is active. FIG. 4(a) illustrates that the circuit elements in soft-switching cell 202 are inactive by omitting them from FIG. 4(a). To facilitate the following explanation of the buck mode operation, FIG. 4(b) shows key waveforms of buck-boost converter 200 during switching cycle $T_S$ of the boost mode operation, in which, for simplicity, boost switch $S_2$ is kept continuously off.

As shown in FIGS. 4(a) and 4(b), before switch $S_{A1}$ is turned on at time $t=T_0$, switches $S_1$, $S_2$ and $S_{A1}$ are off, so that inductor current $i_L$ flows through antiparallel diode $D_2$, as current $i_{LS}$ drawn by soft-switching cell 201 is zero. To reduce the reverse-recovery current of rectifier $D_2$, switch $S_{A1}$ is turned on at time $t=T_0$, shortly prior to turning on buck switch $S_1$. After switch $S_{A1}$ is turned on at time $t=T_0$, current $i_{LS}$ starts to flow as voltage $V_2$ is impressed across serially-connected inductor $L_{S1}$ and primary winding $N_{P1}$ of transformer $TR_1$. As current $i_{LS}$ flows through primary winding $N_{P1}$, a current is induced in secondary winding $N_{S1}$. The induced current in secondary winding $N_{S1}$ flows through diode $D_{B1}$ from a ground reference. So long as the induced current flows through secondary winding $N_{S1}$, the voltage across secondary winding $N_{S1}$ is clamped to the voltage $V_2$, inducing constant primary voltage $V_{P1}=(N_{P1}/N_{S1})\cdot V_2=n_1\cdot V_2$, where $n_1=N_{P1}/N_{S1}$ is the turns ratio of transformer $TR_1$. As a result, after switch $S_{A1}$ is turned on at time $t=T_0$, constant voltage $V_{LS1}=V_2-V_{P1}=V_2-n_2\cdot V_2$ is applied across inductor $L_{S1}$, causing its current $i_{LS1}=i_{LS}$ to decrease linearly from zero. As current $i_L$ of buck-boost inductor L is sufficiently large as to be considered approximately constant during a switching cycle, current $i_{D2}$ in rectifier $D_2$ decreases at the same rate at current $i_{LS1}$ decreases, i.e., $di_{D2}/dt=-(V_2-V_{P1})/L_{S1}$. By controlling the current turn-off rate of rectifier $D_2$, the reverse-recovery losses can be minimized. This current turn-off rate in the buck mode operation of buck-boost converter 200 can be adjusted by a proper selection of turns ratio $n_1$ of transformer $TR_1$ and value of inductor $L_{S1}$.

After rectifier current $i_{D2}$ reaches zero at time $t=T_1$, i.e., after rectifier $D_2$ is turned off, inductor current $i_{LS}$ starts discharging the parasitic output capacitance of switch $S_1$ and charging the parasitic output capacitance of switch $S_2$—the output capacitances of switches $S_1$ and $S_2$ not expressly shown in FIG. 2—by resonance between the output capacitances of switches $S_1$ and $S_2$ and inductor $L_{S1}$. As illustrated in FIG. 4(b), during this resonance, between time $t=T_1$ and time $t=T_2$, voltage $v_{S1}$ across switch $S_1$ decreases while voltage $v_{S2}$ across switch $S_2$ increases, as the sum of the switch voltages is constant (i.e., $v_{S1}+v_{S2}=V_2$). To achieve ZVS, switch $S_1$ is turned on at or shortly after its output capacitance is fully discharged. As shown in FIG. 4(b), switch $S_1$ is turned on when switch voltage $v_{S1}$ reaches zero at time $t=T_2$.

When switch $S_1$ is turned on, negative primary-winding voltage $-V_{P1}$ is impressed across inductor $L_{S1}$, i.e., $v_{LS2}=-V_{P2}$, causing inductor current $i_{LS}$ to increase linearly with a slope $di_{LS}/dt=-V_{P1}/L_{S1}$. After inductor current $i_{LS}$ is reset to zero at time $t=T_3$, switch $S_{A1}$ can be turned-off with ZCS, as shown in FIG. 4(b). When switch $S_{A1}$ is turned off at time $t=T_4$, magnetizing current $i_m$ of transformer $TR_1$ that flows through closed switch $S_{A1}$—not expressly shown in the figures—is diverted through diode $D_{A1}$ to the reset-voltage circuit of capacitor $C_{R1}$ and parallel resistor $R_{R1}$. For proper operation, reset voltage $V_{R1}$ across resistor $R_{R1}$ is set by selecting a suitable value for $R_{R1}$, so that magnetizing current $i_m$ reaches zero before a new cycle begins at time $t=T_5$, when switch $S_1$ is turned off. Since voltage stress on switch $S_{A1}$ is given by the sum of voltage $V_2$ and reset voltage $V_{R1}$ (i.e., $V_2+V_{R1}$), minimizing the value of reset voltage $V_{R1}$ minimizes the stress on switch $S_{A1}$.

Many variations for a buck-boost converter within the scope of the present invention are possible, depending on how the soft-switching cells are connected and how the reset-voltage circuit is implemented. Specifically, terminals A1 and B1 of soft-switching cell 201 and corresponding terminals A2 and B2 of soft-switching cell 202, as shown in FIG. 2, can be connected to different dc voltages that are available in the buck-boost converter or in the power system in which the buck-boost converter is a part. Generally, terminals A1 and B1 can be connected to any set of positive voltages, so long as the voltage at terminal A1 is higher than the voltage at terminal B1. For example, terminals A1 and B1 can be connected to either (i) voltage source $V_2$ and a ground reference, respectively (as shown in FIG. 2), or (ii) voltage source $V_2$ and voltage source $V_1$, respectively. Similarly, terminals A2 and B2 can be connected to any set of positive voltages, so long as the voltage at terminal A2 is lower than the voltage at terminal B2. For example, terminals A2 and B2 can be connected to either (i) a ground reference and voltage source $V_2$, respectively (as shown in FIG. 2), or (ii) voltage source $V_1$ and voltage source $V_2$, respectively.

Figure 5:
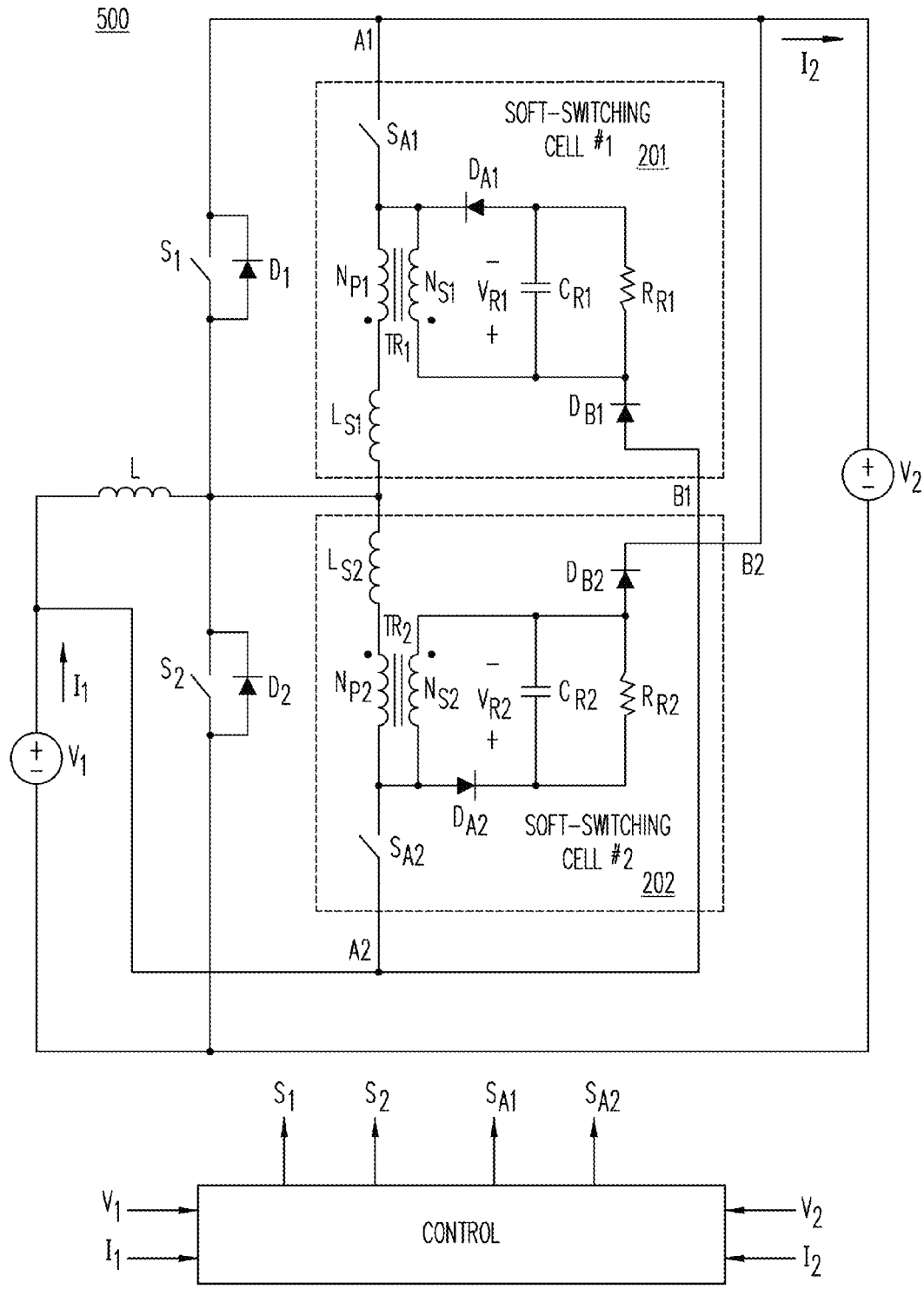
FIG. 5 shows buck-boost converter 500, according to an exemplary embodiment of the present invention, in which terminal B1 of soft-switching cell 201 and terminal A2 of soft-switching cell 202 are connected to voltage source $V_1$.

FIG. 5 shows buck-boost converter 500, according to an exemplary embodiment of the present invention, in which terminal B1 of soft-switching cell 201 and terminal A2 of soft-switching cell 202 are connected to voltage source $V_1$. The operations of buck-boost converter 500 are the same as those of buck-boost converter 200 of FIG. 2, i.e., the operations of the buck-boost converters of the present invention are not affected by how soft-switching cells 201 and 202 are connected. However, the current and voltage stresses of the components of soft-switching cells 201 and 202 are different under different implementations.

The reset-voltage circuit may be also implemented in a variety of ways. For example, the reset-voltage circuit may be implemented on the primary side of transformer TR, instead of being implemented on the secondary side (as shown in FIG. 2). In a primary side implementation, $D_A$-$C_R$-$R_R$ network is connected across primary winding $N_P$. Also, instead of connecting secondary winding $N_S$ to switch $S_A$, secondary winding $N_S$ can be connected directly to a corresponding DC voltage. Specifically, rather than as shown in FIG. 2, secondary windings $N_{S1}$ and $N_{S2}$ of buck-boost converter 200 may be connected directly to voltage source $V_2$ and ground, respectively. According to another embodiment, the reset-voltage may include a transformer with more than two windings.

Figure 6:
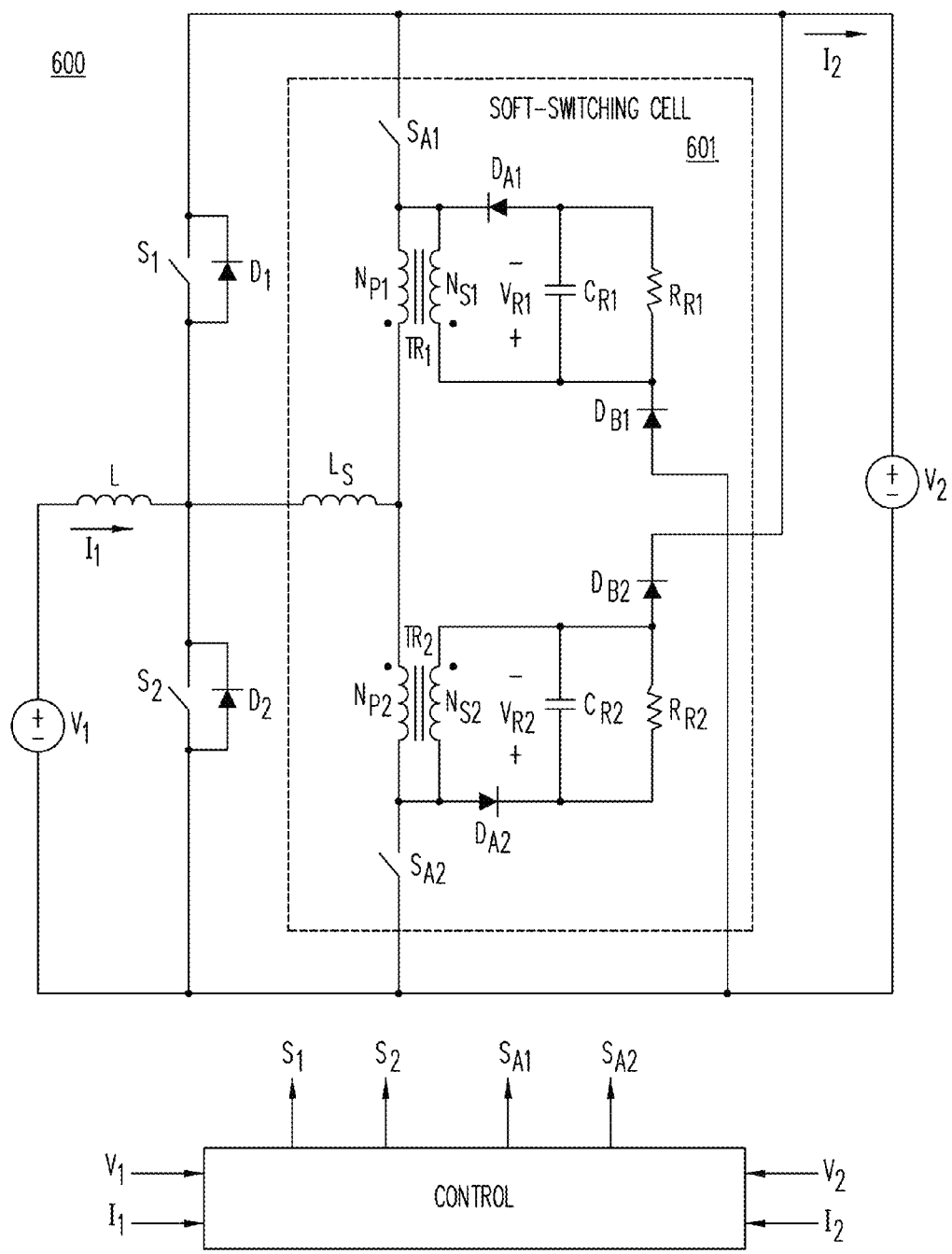
FIG. 6 shows buck-boost converter 600, according to an exemplary embodiment of the present invention, in which inductors $L_{S1}$ and $L_{S2}$ of buck-boost converter 200 of FIG. 2 are implemented by shared inductor $L_S$ in single soft-switching cell 601.
Figure 7:
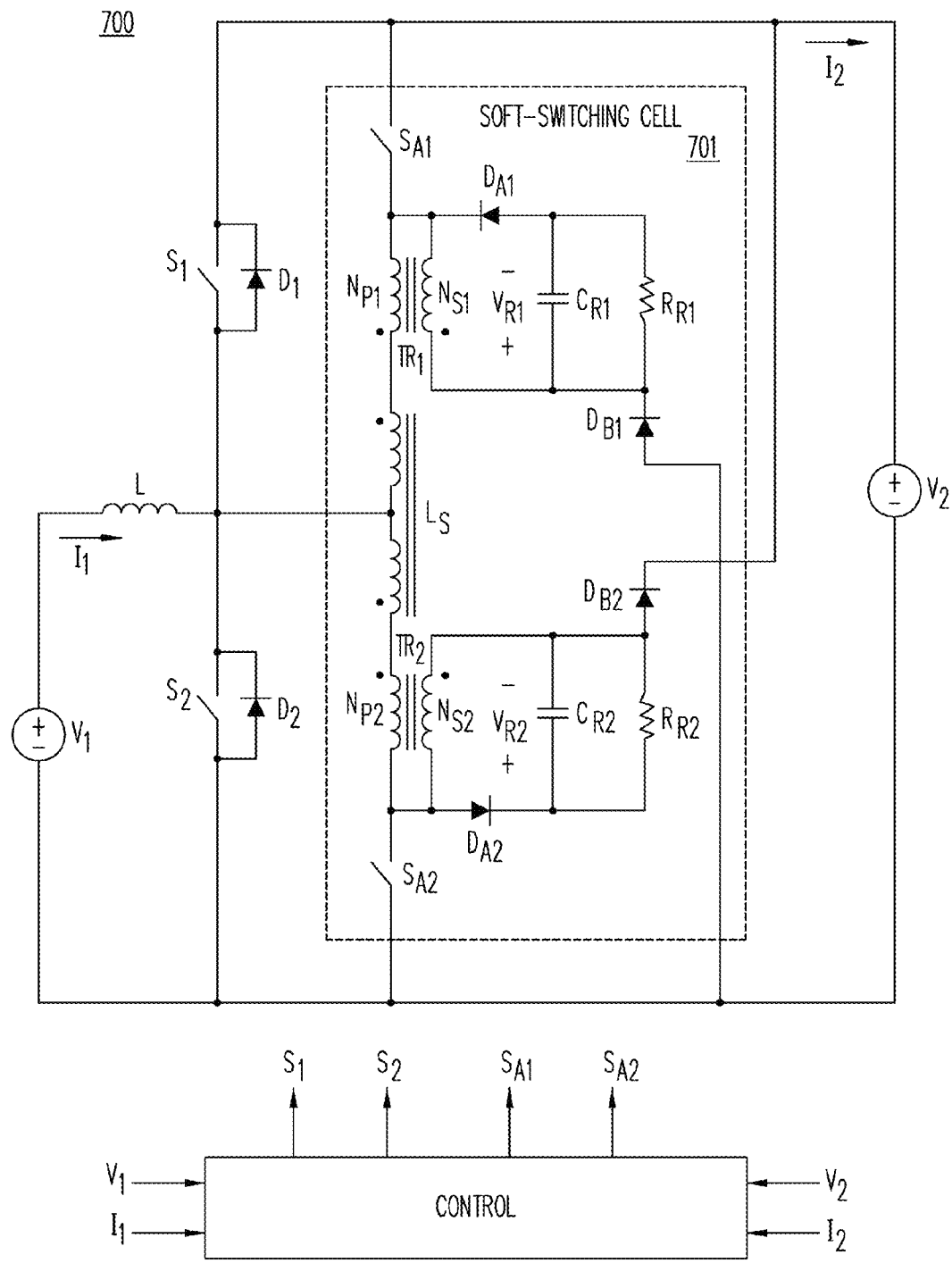
FIG. 7 shows buck-boost converter 700, according to an exemplary embodiment of the present invention, in which inductors $L_{S1}$ and $L_{S2}$ of buck-boost converter 200 of FIG. 2 are implemented by coupled inductor $L_S$ in single soft-switching cell 701 (i.e., by two windings wound on a single core).

Because inductors $L_{S1}$ and $L_{S2}$ do not operate at the same time, numerous variations of buck-boost converter 200 of FIG. 2 that have a reduced number of magnetic components are also possible. FIG. 6 shows buck-boost converter 600, according to an exemplary embodiment of the present invention, in which inductors $L_{S1}$ and $L_{S2}$ of buck-boost converter 200 of FIG. 2 are implemented by shared or common inductor $L_S$ in single soft-switching cell 601. In buck-boost converter 700, according to the exemplary embodiment in FIG. 7, inductors $L_{S1}$ and $L_{S2}$ of buck-boost converter 200 of FIG. 2 are implemented by coupled inductor $L_S$ in single soft-switching cell 701 (i.e., by two windings wound on a single core). Buck-boost converters 600 and 700 of FIGS. 6 and 7 operate in the same manner as buck-boost converter 200 of FIG. 2.

Figure 8:
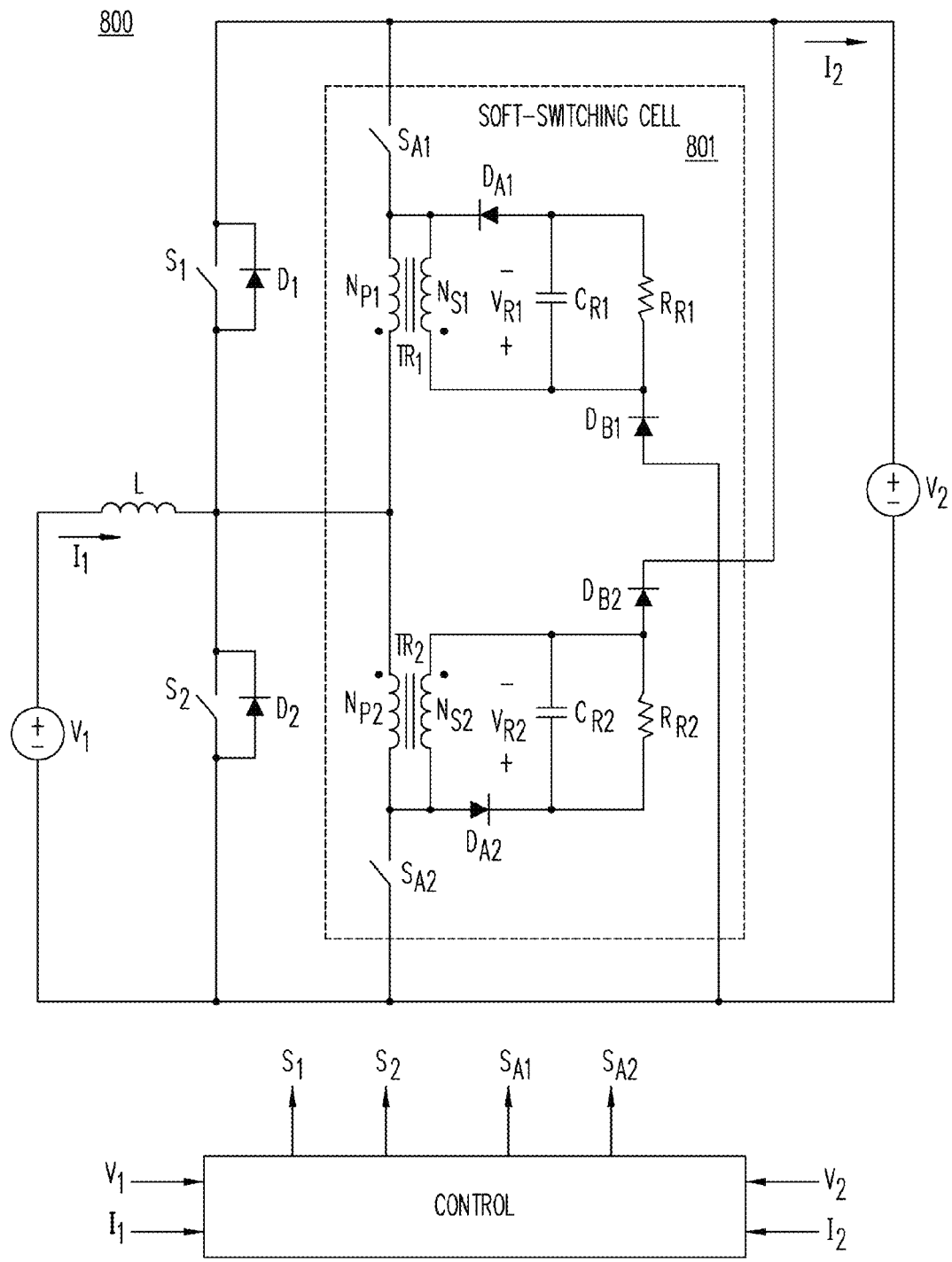
FIG. 8 shows buck-boost converter 800, according to an exemplary embodiment of the present invention, in which discrete inductors $L_{S1}$ and $L_{S2}$ of buck-boost converter of FIG. 2 are completely eliminated by implementing them with the leakage inductance of transformers $TR_1$ and $TR_2$, respectively.

Furthermore, discrete inductors $L_{S1}$ and $L_{S2}$ of buck-boost converter 200 of FIG. 2 can be completely eliminated by implementing them with the leakage inductance of transformers $TR_1$ and $TR_2$, respectively, as illustrated by buck-boost converter 800 of FIG. 8.

Further component reduction can be achieved by sharing a transformer and a reset-voltage circuit (i.e., by using the same switching cell) between boost and buck modes of operation. Such a buck-boost converter is illustrated by, for example, buck-boost converter 900 of FIG. 9. In buck-boost converter 900, soft-switching cell 901 includes additional switches $S_{B1}$ and $S_{B2}$ which provide proper polarities for the reset-voltages under boost and buck modes. In a boost mode, switch $S_{B1}$ is turned on and switch $S_{B2}$ is turned off, so that reset voltage $V_R$ is positive. In a buck mode, switch $S_{B2}$ is turned on and switch $S_{B1}$ is turned off, so that reset voltage $V_R$ is negative.

Figure 9:
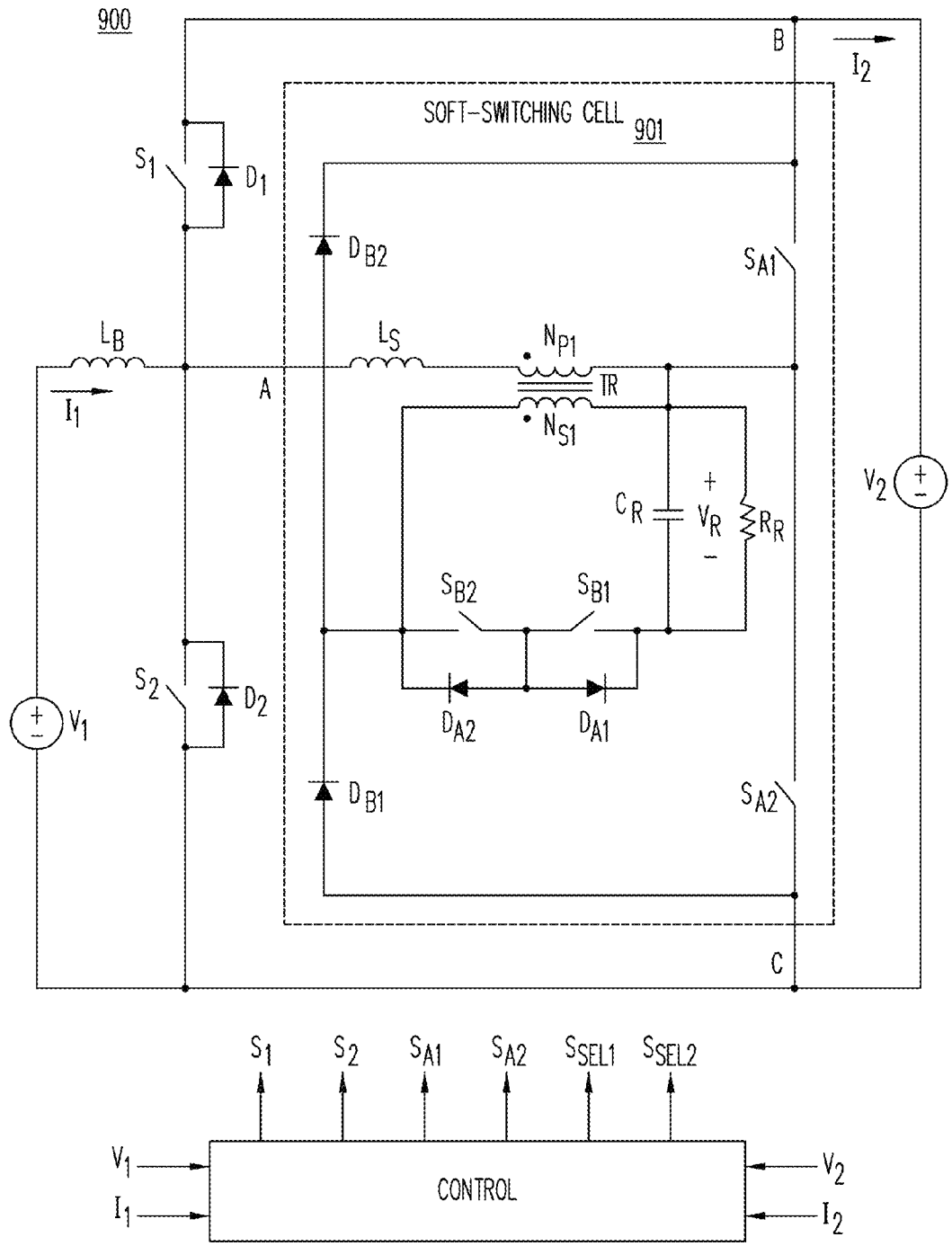
FIG. 9 shows buck-boost converter 900, according to an exemplary embodiment of the present invention, in which a transformer and a reset-voltage circuit are shared (i.e., by using the same switching cell) between boost and buck modes of operation.
Figure 10:
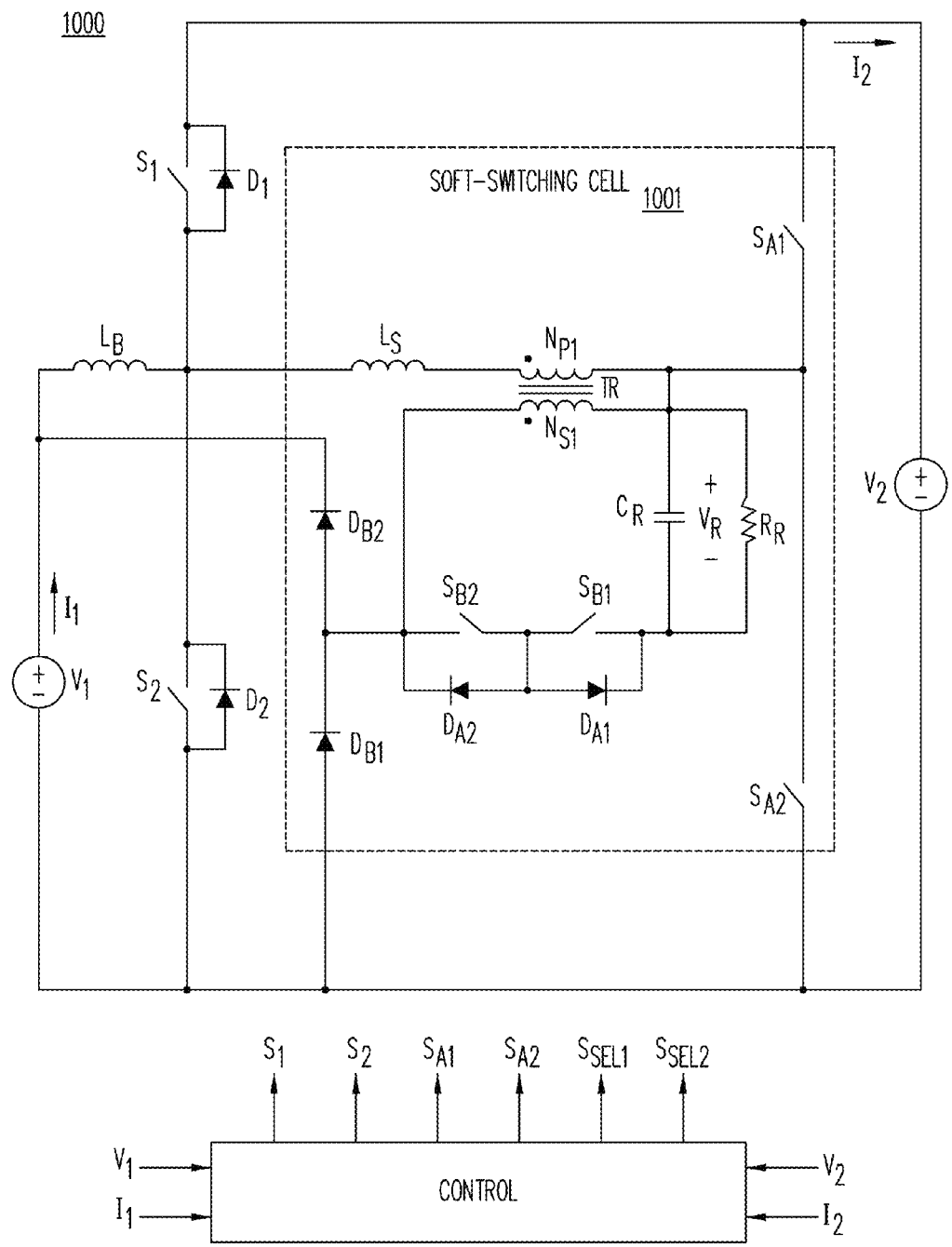
FIG. 10 shows buck-boost converter 1000, according to an exemplary embodiment of the present invention, in which single soft-switching cell 1001 includes diode $D_{B2}$ that is connected to voltage source $V_1$.
Figure 11:
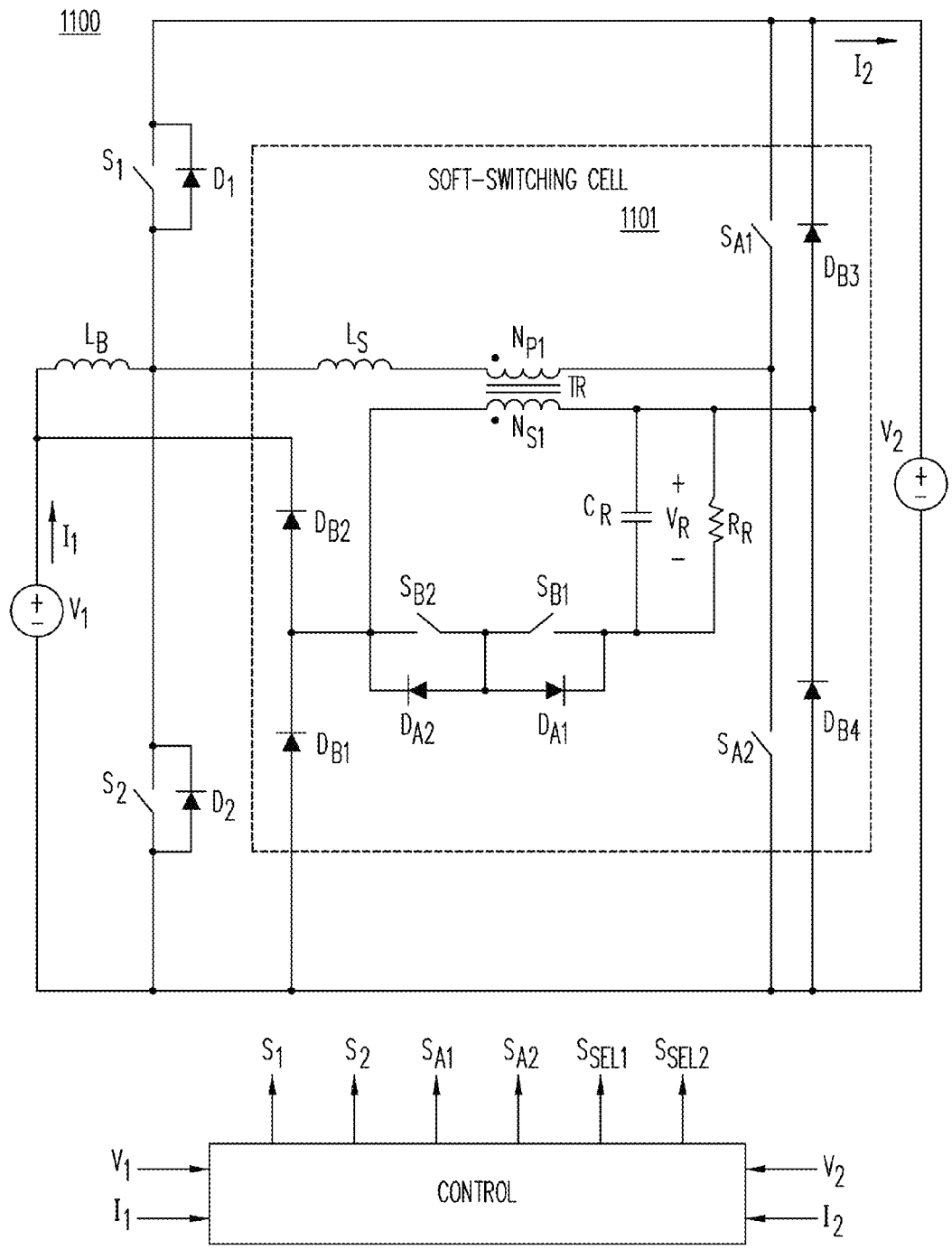
FIG. 11 shows buck-boost converter 1100, according to an exemplary embodiment of the present invention, in which winding $N_S$ is coupled to a ground reference and voltage $V_2$ through rectifiers $D_{B3}$ and $D_{B4}$.

Sharing of a transformer and a reset-voltage circuit between buck and boost modes of operation can also be implemented in a number of ways. For example, the anode of diode $D_{B2}$ of buck-boost converter 900 can be connected to any positive voltage, instead of voltage source $V_2$ as shown in FIG. 9. For example, in buck-boost converter 1000 of FIG. 10, diode $D_{B2}$ of single soft-switching cell 1001 is connected to voltage source $V_1$. Also, secondary winding $N_S$ need not to be connected to either one of switches $S_{A1}$ and $S_{A2}$, as shown in FIG. 9 or FIG. 10, but can be coupled to a ground reference and voltage $V_2$ (or any positive voltage) through rectifiers, such as rectifiers $D_{B3}$ and $D_{B4}$, such as shown buck-boost converter 1100 of FIG. 11.

Figure 12:
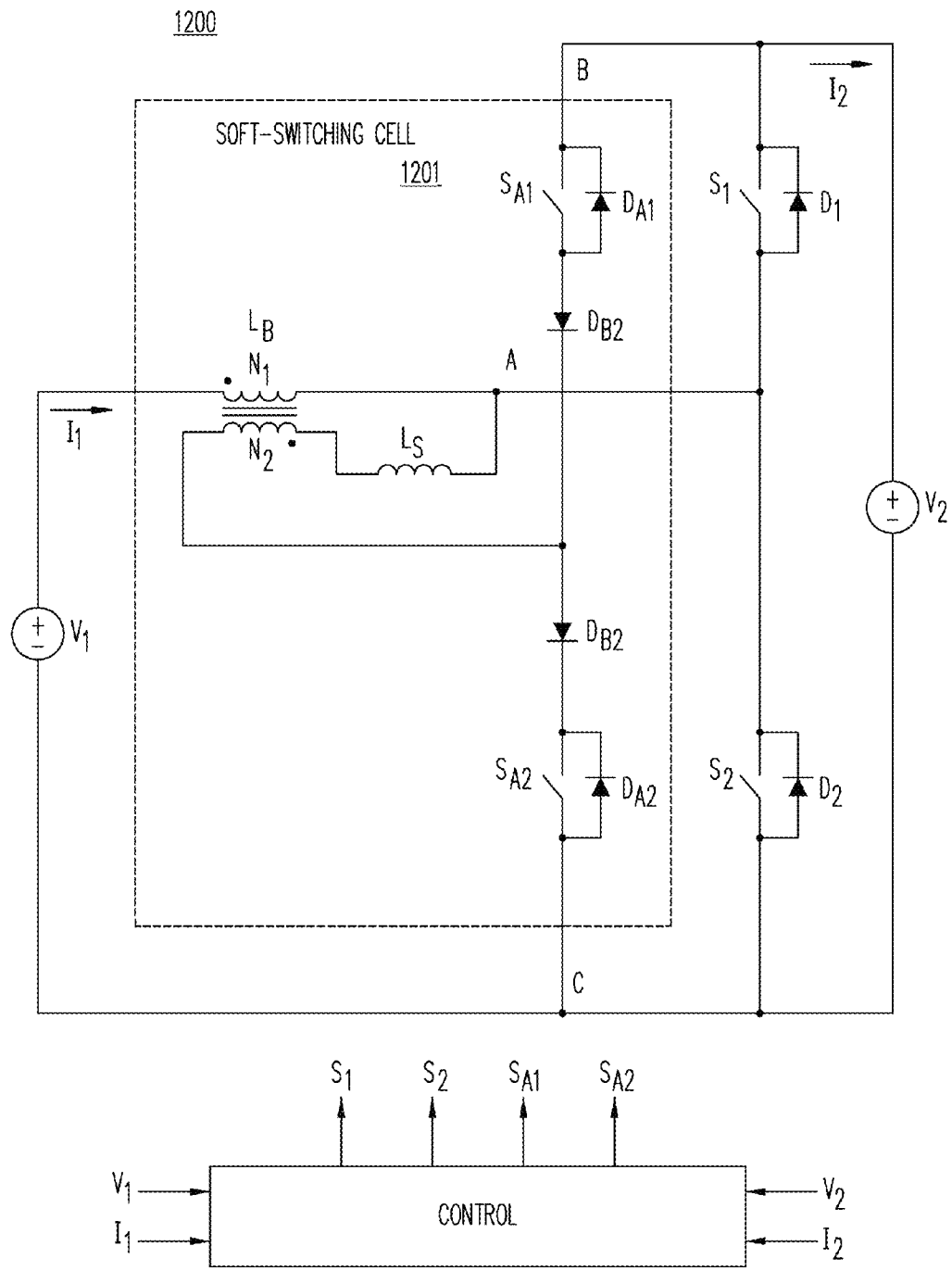
FIG. 12 shows soft-switched, bidirectional buck-boost converter 1200, in accordance with an exemplary embodiment of the present invention, in which functions of transformers $TR_1$ and $TR_2$ of buck-boost converter 200 of FIG. 2 are implemented by coupled boost inductor $L_B$.
Figure 13A:
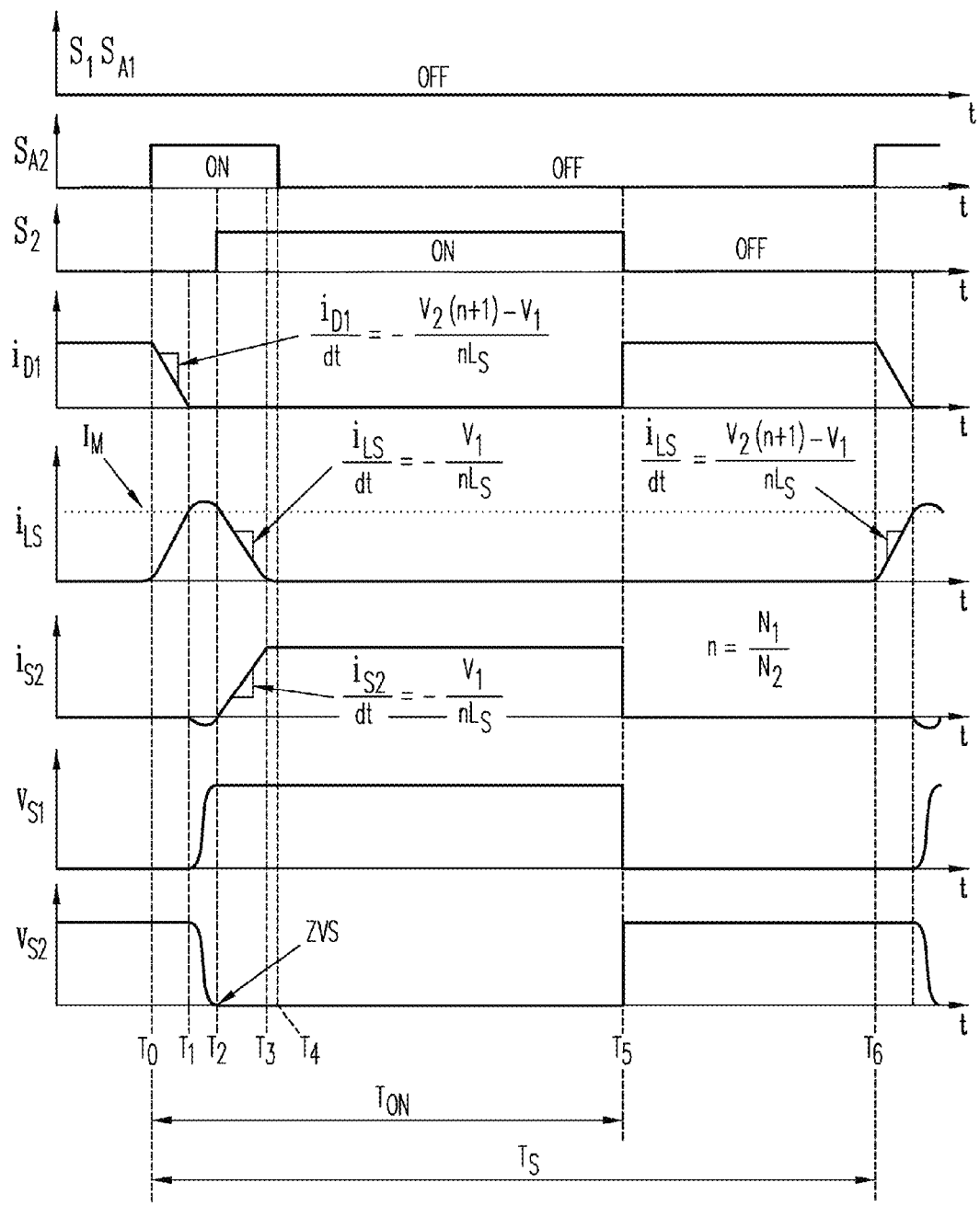
FIG. 13(a) shows key waveforms of soft-switched buck-boost converter 1200 of FIG. 12, when it operates in a boost mode.

Transformer TR and the reset-voltage circuit shown in FIG. 9 can be eliminated by implementing inductor $L_B$ as a two-winding coupled inductor, as shown in FIG. 12. In coupled inductor $L_B$ of FIG. 12, winding $N_2$ provides a required voltage for controlling the current in inductor $L_S$, so that soft switching of all semiconductor circuit elements is achieved. To facilitate the following detailed description of the boost mode operation, FIG. 13(a) shows key waveforms of buck-boost converter 1200 during switching cycle $T_S$ of a boost mode operation. For simplicity, the example in FIG. 13(a) has buck switch $S_1$ and $S_{A1}$ kept continuously off.

As shown in FIG. 13(a), prior to switch $S_{A2}$ turning on at time $t=T_0$, switches $S_2$ and $S_{A2}$ are off, so that magnetizing current $i_M$ of coupled inductor $L_B$ flows through antiparallel diode $D_1$, as the current drawn by soft-switching cell 1201 is zero. To reduce the reverse-recovery current of rectifier $D_1$, switch $S_{A2}$ is turned on at time $t=T_0$, shortly prior to turning on boost switch $S_2$. After switch $S_{A2}$ is turned on at time $t=T_0$, current $i_{LS}$ starts to flow as voltages $V_2$ and the induced voltage across winding $N_2$ of coupled inductor $L_B$ are impressed across serially-connected inductor $L_S$. The induced voltage across winding $N_2$ of inductor $L_B$ is $(V_2-V_1)/n$, where $n=N_1/N_2$ is the turns ratio of coupled inductor $L_B$. As a result, after switch $S_{A2}$ is turned on at time $t=T_0$, constant voltage $V_{LS}=V_2+(V_2-V_1)/n$ is applied across inductor $L_S$, causing its current $i_{LS}$ to increase linearly. As magnetizing current $i_M$ of coupled inductor $L_B$ is sufficiently large as to be considered approximately constant during a switching cycle, current $i_{D1}$ in rectifier $D_1$ decreases at the same rate at which current $i_{LS}$ increases, i.e., $di_{D1}/dt=-[V_2(n+1)-V_1]/nL_S$. By controlling the current turn-off rate in rectifier $D_1$, the reverse-recovery losses can be minimized. This current turn-off rate under the boost mode operation of buck-boost converter 1200 can be adjusted by a proper selection of turns ratio n in coupled inductor $L_B$ and the value of inductor $L_S$.

After rectifier current $i_{D1}$ reaches zero at time $t=T_1$, i.e., after rectifier $D_1$ is turned off, inductor current $i_{LS}$ starts discharging the parasitic output capacitance of switch $S_2$ and charging the parasitic output capacitance of switch $S_1$—i.e., the output capacitances of switches $S_1$ and $S_2$ not expressly shown in FIG. 12—by resonance between the output capacitances of switches $S_1$ and $S_2$ and inductor $L_S$. As illustrated in FIG. 13(a), during this resonance, between time $t=T_1$ and time $t=T_2$, voltage $v_{S2}$ across switch $S_2$ decreases while voltage $v_{S1}$ across switch $S_1$ increases, as the sum of the switch voltages is constant (i.e., $v_{S1}+v_{S2}=V_2$). To achieve ZVS, switch $S_2$ is turned on at or shortly after its output capacitance is fully discharged. As shown in FIG. 13(a), switch $S_2$ is turned on when switch voltage $v_{S2}$ reaches zero at time $t=T_2$.

When switch $S_2$ is turned on, the secondary-winding voltage of coupled inductor $L_B$ is $-V_1/n$ and is impressed across inductor $L_S$, i.e., $v_{LS}=-V_1/n$, causing inductor current $i_{LS}$ to decrease linearly with a slope $di_{LS}/dt=-V_1/nL_S$. After inductor current $i_{LS}$ is reset to zero at time $t=T_3$, switch $S_{A2}$ can be turned-off with ZCS, as shown in FIG. 13(a). Switch $S_{A2}$ is turned off at time $t=T_4$ before switch $S_2$ is turned off at time $t=T_5$. Since voltage stress on switch $S_{A2}$ is given by the sum of voltage $V_2$ and the induced voltage across winding $N_2$ of inductor $L_B$, i.e., $(V_2-V_1)/n$, suitably selecting n minimizes the stress on switch $S_{A2}$.

Figure 13B:
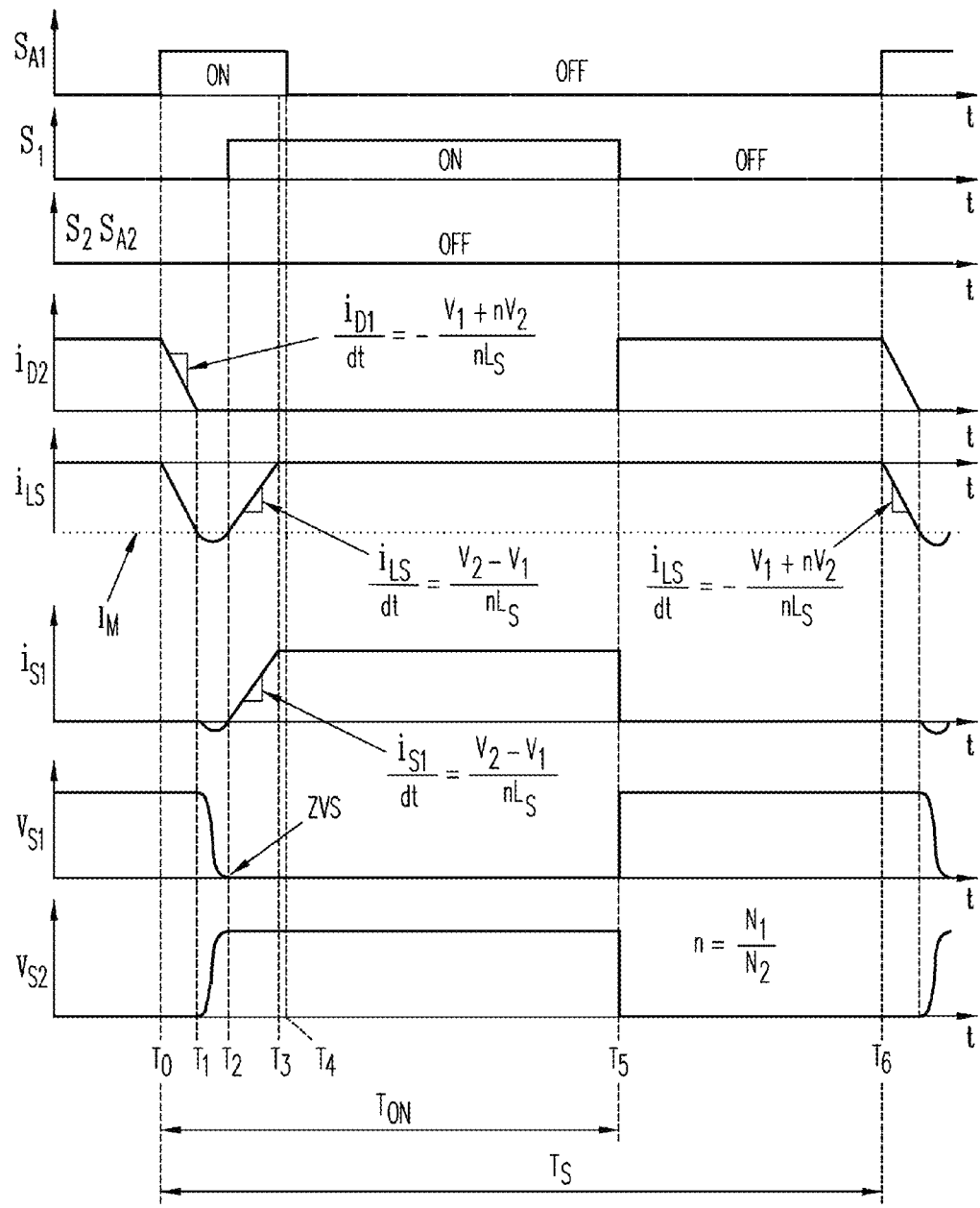
FIG. 13(b) shows key waveforms of soft-switched buck-boost converter 1200 of FIG. 12, when it operates in a buck mode.

FIG. 13(b) shows the key waveforms of the buck-boost circuit in FIG. 12, when buck-boost converter 1200 operates in a buck mode, i.e., when power is transferred from $V_2$ to $V_1$. In a buck mode, switches $S_2$ and $S_{A2}$ are turned off. As shown in FIG. 13(b), the operation of buck-boost converter 1200 under a buck mode closely mirrors the operation described above in conjunction with FIG. 13(a) for boost mode.

As shown in FIG. 13(b), before switch $S_{A1}$ is turned on at time $t=T_0$, switches $S_1$ and $S_{A1}$ are off, so that magnetizing current $i_M$ of coupled inductor $L_B$ flows through antiparallel diode $D_2$, as the current drawn by soft-switching cell 1201 is zero. To reduce the reverse-recovery current of rectifier $D_2$, switch $S_{A1}$ is turned on at time $t=T_0$, shortly prior to turning on buck switch $S_1$. After switch $S_{A1}$ is turned on at time $t=T_0$, current $i_{LS}$ starts to flow as voltages $V_2$ and the induced voltage across winding $N_2$ of inductor $L_B$ are impressed across inductor $L_S$. As a result, after switch $S_{A1}$ is turned on at time $t=T_0$, constant voltage $V_{LS}=-(V_2+V_1/n)$ is applied across inductor $L_S$, causing its current $i_{LS}$ to decrease linearly from zero. As magnetizing current $i_M$ of coupled inductor $L_B$ is sufficiently large as to be considered approximately constant during a switching cycle, current $i_{D2}$ in rectifier $D_2$ decreases at the same rate at which current $i_{LS}$ decreases, i.e., $di_{D2}/dt=-(V_1+nV_2)/nL_S$. By controlling the current turn-off rate of rectifier $D_2$, the reverse-recovery losses can be minimized.

After rectifier current $i_{D2}$ reaches zero at time $t=T_1$, i.e., after rectifier $D_2$ is turned off, inductor current $i_{LS}$ starts discharging the parasitic output capacitance of switch $S_1$ and charging the parasitic output capacitance of switch $S_2$—i.e., the output capacitances of switches $S_1$ and $S_2$ not expressly shown in FIG. 12—by resonance between the output capacitances of switches $S_1$ and $S_2$ and inductor $L_S$. As illustrated in FIG. 13(b), during this resonance, between time $t=T_1$ and time $t=T_2$, voltage $v_{S1}$ across switch $S_1$ decreases while voltage $v_{S2}$ across switch $S_2$ increases, as the sum of the switch voltages is constant (i.e., $v_{S1}+v_{S2}=V_2$). To achieve ZVS, switch $S_1$ is turned on at or shortly after its output capacitance is fully discharged. As shown in FIG. 13(b), switch $S_1$ is turned on when switch voltage $v_{S1}$ reaches zero at time $t=T_2$.

When switch $S_1$ is turned on, the secondary-winding voltage of coupled inductor $L_B$ is impressed across inductor $L_S$, i.e., $v_{LS}=(V_2-V_1)/n$, causing inductor current $i_{LS}$ to increase linearly with a slope $di_{LS}/dt=(V_2-V_1)/nL_S$. After inductor current $i_{LS}$ is reset to zero at time $t=T_3$, switch $S_{A1}$ can be turned-off with ZCS, as shown in FIG. 13(b). Switch $S_{A1}$ is turned off at time $t=T_4$ before switch $S_1$ is turned off at time $t=T_5$.

Figure 14:
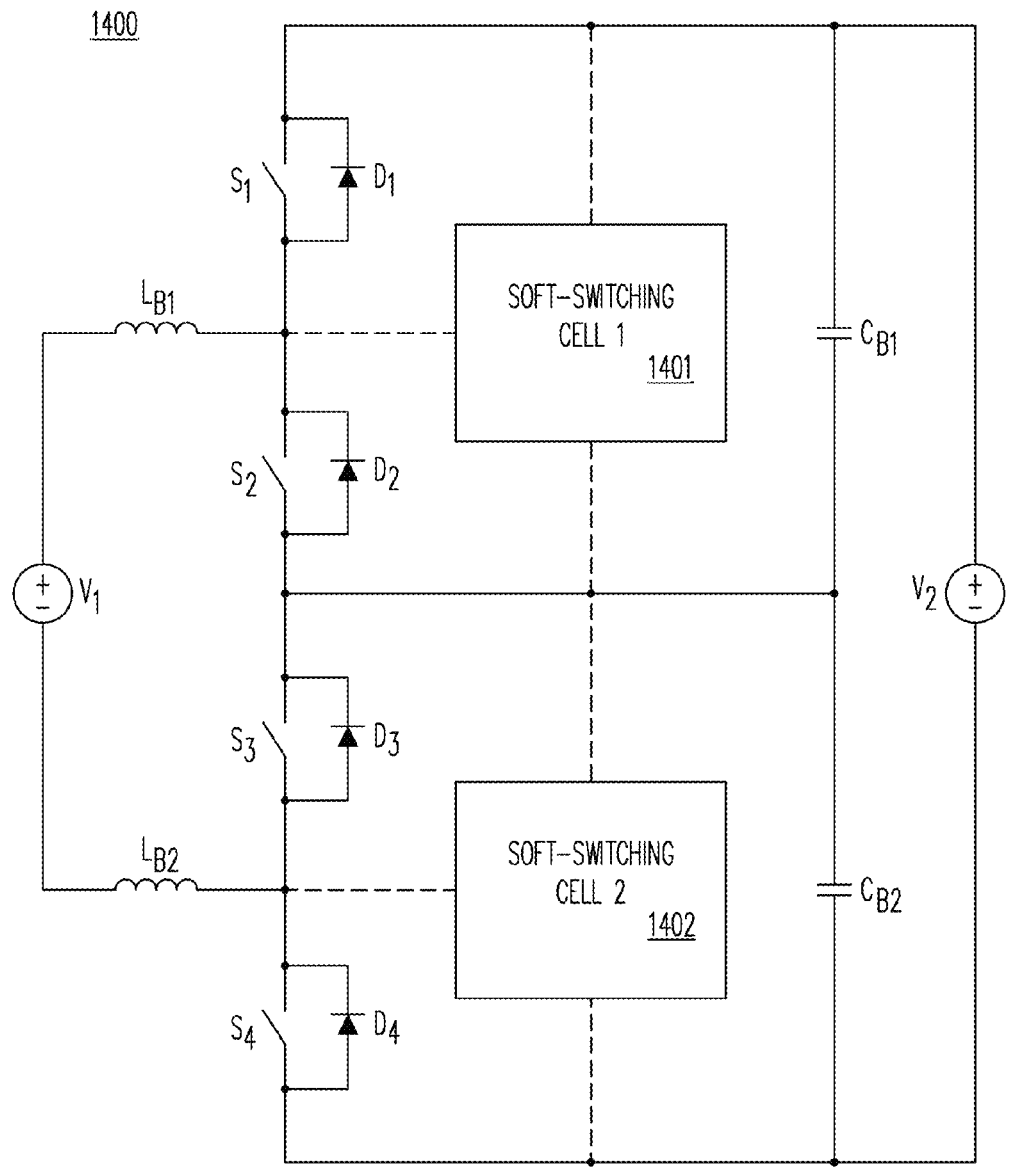
FIG. 14 shows three-level bidirectional buck-boost converter 1400, according to an exemplary embodiment of this invention, in which soft-switching cells 1401 and 1402 are provided.

The soft-switching methods of the present invention can also be applied to multi-level bidirectional buck-boost converters. For example, FIG. 14 shows three-level bidirectional buck-boost converter 1400, according to an exemplary embodiment of this invention, in which soft-switching cells 1401 and 1402 are provided. Soft-switching cells 1401 and 1402 may each be implemented, for example, by single soft-switching cell 901 of FIG. 9.

Figure 15:
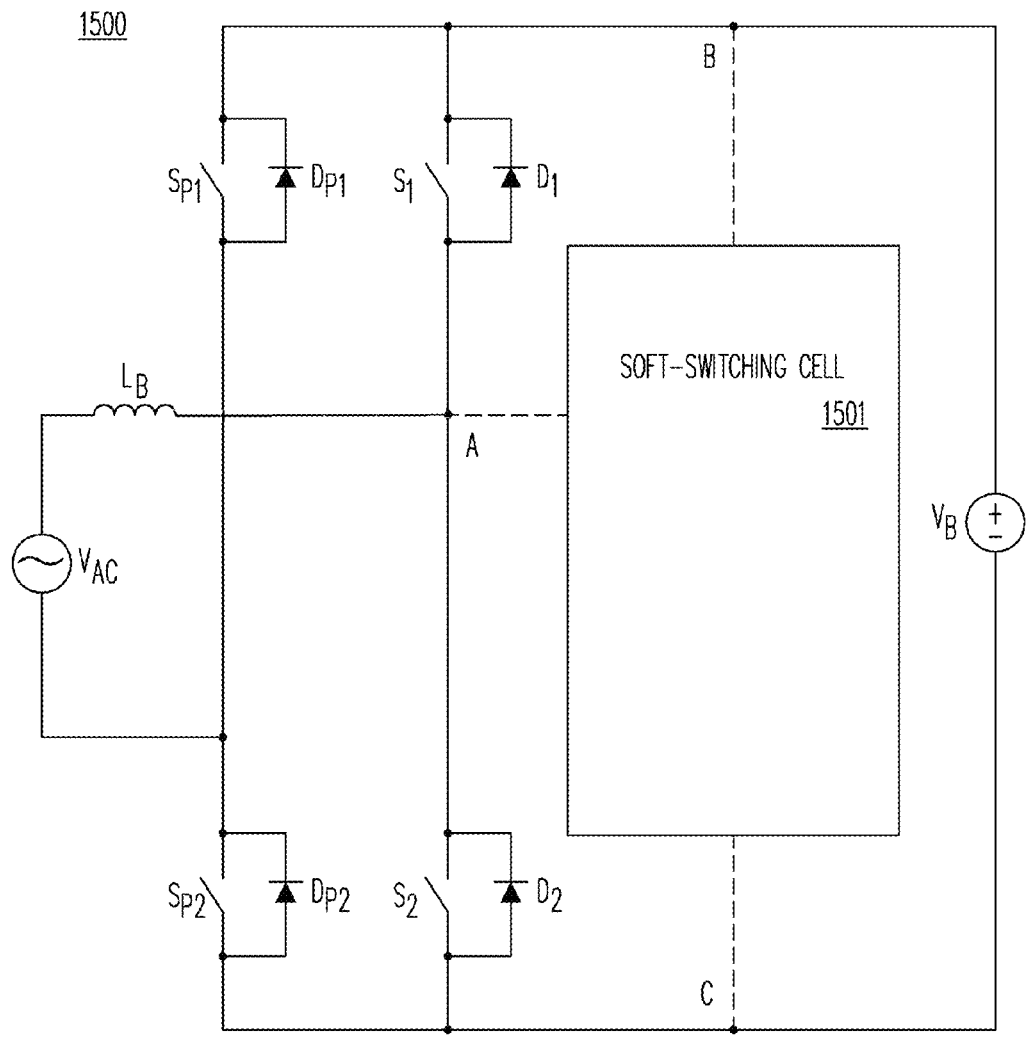
FIG. 15 shows single-phase bidirectional AC-DC converter 1500 with soft-switching cell 1501, in which soft-switching cell 1501 operates as a power-factor-correction (PFC) rectifier when power is transferred from AC voltage source $V_{AC}$ to DC voltage source $V_B$ and in which soft-switching cell 1501 operates as an inverter when power is transferred in the opposite direction, according to an exemplary embodiment of the present invention.

The soft-switching methods of the bidirectional buck-boost converter of the present invention can also be applied to applications where energy is exchange between AC and DC sources. For example, FIG. 15 shows single-phase bidirectional AC-DC converter 1500 with soft-switching cell 1501, in which soft-switching cell 1501 operates as a power-factor-correction (PFC) rectifier when power is transferred from AC voltage source $V_{AC}$ to DC voltage source $V_B$ and in which soft-switching cell 1501 operates as an inverter when power is transferred in the opposite direction. In single-phase bidirectional AC-DC converter 1500, soft-switching cell 1501 may be implemented, for example, by soft-switching cell 901 of FIG. 9. In single-phase bidirectional AC-DC converter 1500, during operation in the rectifier mode, switches $S_{P1}$ and $S_{P2}$ are kept open. During operation in the inverter mode, switch $S_{P1}$ is closed only during negative half-cycles of voltage source $V_{AC}$ and switch $S_{P2}$ is closed only during positive half-cycles of voltage source $V_{AC}$.

Figure 16:
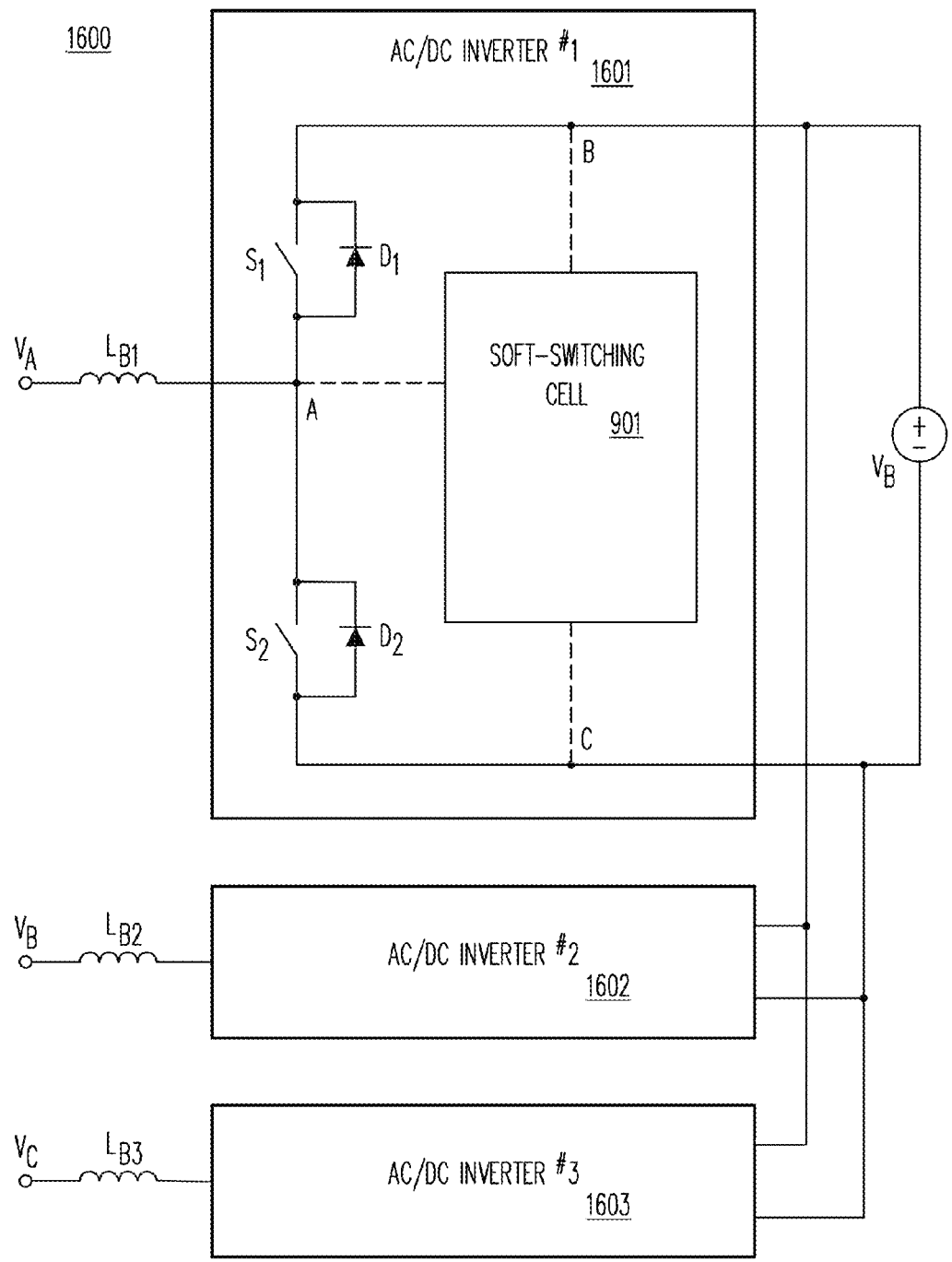
FIG. 16 shows three-phase DC-AC inverter 1600, according an exemplary embodiment of the present invention, in which each phase is implemented by a bidirectional buck-boost converter of the present invention.

FIG. 16 shows three-phase DC-AC inverter 1600, according an exemplary embodiment of the present invention, in which each phase is implemented by a bidirectional buck-boost converter of the present invention. In three-phase DC-AC inverter 1600, the phases are implemented by buck-boost converters 1601, 1602 and 1603, each including a soft-switching cell, which may be implemented by soft-switching cell 901 of FIG. 9.

Although the soft-switching methods of this invention are primarily aimed at reducing reverse-recovery-related losses of fast-recovery Si rectifiers, they are not limited to these applications. For example, the soft-switching methods of the present invention may be used with SiC and GaN switches that exhibit little reverse recovery losses. In such applications, the soft-switching methods of the present invention improve high-frequency-switching performance by reducing turn-on switching losses using ZVS.

The above detailed description is provided to illustrate specific embodiments of the present invention and is not intended to be limiting the scope of the present invention. Numerous variations and modifications of the present inventions are possible. The present invention is set forth in the following claims.

We claim:

1. A non-isolated bidirectional buck-boost converter having a first terminal, a second terminal and a ground terminal, configured for connecting a first voltage source between the first terminal and the ground terminal and for connecting a second voltage source between the second terminal and the ground terminal, the non-isolated bidirectional buck-boost converter comprising:
   a common node;
   an inductor;
   a first switch connected between the common node and the second terminal;
   a second switch connected between the common node and the ground terminal;
   first and second auxiliary switches, and
   a soft-switching cell having a first terminal, a second terminal and a third terminal, the second terminal of the soft-switching cell being connected by the inductor to the common node, wherein, when the non-isolated bidirectional buck-boost converter operates in a boost mode, the second auxiliary switch is closed so as to cause a current to flow through the inductor into the soft-switching cell to allow the second switch to close under a zero-voltage switching condition, and, wherein, when the non-isolated bidirectional buck-boost converter operates in a buck mode, the first auxiliary switch is closed so as to cause a current to flow through the inductor out of the soft-switching cell to allow the first switch to close under a zero-voltage switching condition.

2. The non-isolated bidirectional buck-boost converter of claim 1, further comprising an inductor connected between the first terminal of the non-isolated bidirectional buck-boost converter and the common node.

3. The non-isolated bidirectional buck-boost converter of claim 2, wherein the soft-switching cell comprises first and second soft-switching circuits that are connected by the first and second auxiliary switches to the first and third terminals of the soft-switching cell, thereby providing the zero-voltage switching conditions of the second switch and the first switch, respectively.

4. The non-isolated bidirectional buck-boost converter of claim 3, wherein the first soft-switching circuit comprises:
   a transformer having a primary winding and a secondary winding, wherein the primary winding and the first auxiliary switch are connected in series between the first terminal of the soft-switching cell and the second terminal of the soft-switching cell and wherein the secondary winding is connected between the first auxiliary switch and the third terminal of the soft-switching cell; and
   a reset-voltage circuit connected between the first auxiliary switch and the third terminal of the soft-switching cell.

5. The non-isolated bidirectional buck-boost converter of claim 4, wherein the inductor is connected in series with the primary winding of the transformer.

6. The non-isolated bidirectional buck-boost converter of claim 4, wherein the inductor comprises a coupled inductor.

7. The non-isolated bidirectional buck-boost converter of claim 4, wherein leakage inductance of the transformer in each of the first and second soft-switching circuits determines the current into and out of the soft-switching cell.

8. The non-isolated bidirectional buck-boost converter of claim 1, wherein the soft-switching cell comprises:
   a first switch;
   a second switch;
   an inductor;
   a coupled inductor having a first winding and a second winding, wherein the first winding and the first switch are connected in series between the first terminal of the soft-switching cell and the first terminal of the non-isolated buck-boost converter, and wherein the second winding, the inductor and the second switch of the soft switching cell are connected in series between the second and third terminals of the soft-switching cell.

9. The non-isolated bidirectional buck-boost converter of claim 8, further comprising diodes for controlling direction of currents in the first and third terminals of the soft-switching cell when the first and second switches of the soft-switching cell are closed, respectively.

10. The non-isolated bidirectional buck-boost converter of claim 1, wherein the non-isolated bidirectional buck-boost converter is one of a plurality of buck-boost converters that are connected in parallel and that operate in different phases.

11. The non-isolated bidirectional buck-boost converter of claim 1, wherein the first voltage source is an AC voltage source.

12. The non-isolated bidirectional buck-boost converter of claim 1, wherein the non-isolated bidirectional buck-boost converter is one of a plurality of buck-boost converters that are connected to operate between different levels.

13. A non-isolated bidirectional buck-boost converter having a first terminal, a second terminal and a ground terminal, configured for connecting a first voltage source between the first terminal and the ground terminal and for connecting a second voltage source between the second terminal and the ground terminal, the non-isolated bidirectional buck-boost converter comprising:
   a common node;
   a main inductor connected between the first terminal and the common node;
   a first switch connected between the common node and the second terminal;
   a second switch connected between the common node and the ground terminal; and
   a soft-switching cell having a first terminal coupled to the second terminal of the non-isolated bidirectional buck-boost converter, a second terminal, and a third terminal coupled to the ground terminal, the second terminal of the soft-switching cell being connected to the common node, wherein the soft-switching cell comprises:
      an inductor;
      a transformer having a primary winding and a secondary winding;
      a first switch and a second switch, wherein the inductor of the soft-switching cell, the primary winding and the first switch of the soft-switching cell are connected in series between the second terminal of the soft-switching cell and the first terminal of the soft-switching cell, wherein the inductor of the soft-switching cell, the primary winding and the second switch of the soft-switching cell are connected in series between the second terminal of the soft-switching cell and the third terminal of the soft-switching cell; and a reset-voltage circuit connected in parallel to the secondary winding.

14. The non-isolated bidirectional buck-boost converter of claim 13, wherein the reset-voltage circuit comprises a diode, a capacitor and a resistor, wherein the resistor and the capacitor are connected in parallel, wherein the diode and the secondary winding of the transformer are connected in series.

15. The non-isolated bidirectional buck-boost converter of claim 13, the soft-switching cell further comprising a third switch and a fourth switch that are selectively closed to select an appropriate voltage polarity across the reset-voltage circuit during boost mode and during buck mode respectively.

16. The non-isolated bidirectional buck-boost converter of claim 15, wherein one end of the secondary winding is selectively connected by the first and the second switches of the soft-switching cell to the first and third terminals of the soft-switching cell, respectively.

17. The non-isolated bidirectional buck-boost converter of claim 16, wherein the other terminal of the secondary winding is connected by rectifiers to the first and third terminals of the soft-switching cell.

18. The non-isolated bidirectional buck-boost converter of claim 16, further comprising a rectifier between the first terminal of the non-isolated bidirectional buck-boost converter and the other terminal of the secondary winding.

19. The non-isolated bidirectional buck-boost converter of claim 15, wherein one end of the secondary winding is connected by rectifiers to the first and third terminals of the soft-switching cell.

20. The non-isolated bidirectional buck-boost converter of claim 19, wherein a third rectifier connects the other end of the secondary winding to the first terminal of the non-isolated bidirectional buck-boost converter.

21. The non-isolated bidirectional buck-boost converter of claim 13, wherein, to achieve zero-voltage switching in the first switch of the non-isolated bidirectional buck-boost converter, the first switch of the soft-switching cell is closed prior to closing the first switch of the non-isolated bidirectional buck-boost converter.

22. The non-isolated bidirectional buck-boost converter of claim 21, wherein the first switch of the soft-switching cell is opened under a zero-current switching condition.

23. The non-isolated bidirectional buck-boost converter of claim 13, further comprising first and second polarity switches that control a direction of current flow in the secondary winding of the transformer during boost and buck modes, respectively.

24. The non-isolated bidirectional buck-boost converter of claim 13, further comprising diodes for unidirectionally connecting each of the first and third terminals of the soft-switching cell to a selected one of the first, second and ground terminals of the nonisolated bidirectional buck-boost converter.

25. The non-isolated bidirectional buck-boost converter of claim 13, further comprising diodes for unidirectionally connecting the secondary winding to the first and ground terminals of the non-isolated bidirectional buck-boost converter.

* * * * *